United States Patent
Karzig

(10) Patent No.: US 10,496,933 B1
(45) Date of Patent: Dec. 3, 2019

(54) ROBUST MAJORANA MAGIC GATES VIA MEASUREMENTS

(71) Applicant: Microsoft Technology Licensing, LLC, Redmond, WA (US)

(72) Inventor: Torsten Karzig, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/226,446

(22) Filed: Dec. 19, 2018

(51) Int. Cl.
*G06N 10/00* (2019.01)

(52) U.S. Cl.
CPC .................................. *G06N 10/00* (2019.01)

(58) Field of Classification Search
CPC ................................ G06N 10/00; B82Y 10/00
See application file for complete search history.

(56) References Cited

U.S. PATENT DOCUMENTS

| | | | | |
|---|---|---|---|---|
| 7,899,852 B2 * | 3/2011 | Amin | ...................... | G06N 10/00 708/2 |
| 8,209,279 B2 * | 6/2012 | Freedman | .............. | B82Y 10/00 706/62 |
| 10,171,088 B1 * | 1/2019 | Kim | ........................ | G06N 20/00 |
| 2006/0224547 A1 * | 10/2006 | Ulyanov | ................. | G06N 10/00 706/62 |
| 2010/0182039 A1 * | 7/2010 | Baumgardner | ........ | G06N 10/00 326/7 |
| 2014/0354326 A1 * | 12/2014 | Bonderson | ............. | G06N 10/00 326/5 |
| 2017/0091649 A1 * | 3/2017 | Clarke | .................... | G06N 10/00 |
| 2017/0141287 A1 * | 5/2017 | Barkeshli | .............. | H01L 39/223 |
| 2018/0053809 A1 * | 2/2018 | Freedman | .............. | G06N 10/00 |
| 2018/0196780 A1 * | 7/2018 | Amin | ...................... | G06N 7/005 |
| 2018/0248566 A1 * | 8/2018 | Hastings | ................ | G06N 10/00 |
| 2019/0080254 A1 * | 3/2019 | Haah | ....................... | G06N 10/00 |
| 2019/0080256 A1 * | 3/2019 | Irwin | ..................... | G06N 10/00 |

* cited by examiner

*Primary Examiner* — Jason Crawford
(74) *Attorney, Agent, or Firm* — Klarquist Sparkman, LLP

(57) ABSTRACT

Embodiments of the disclosed technology concern a method for implementing a π/8 phase gate in a quantum computing device. In certain embodiments, a quantum circuit is evolved from an initial state to a target state using a hybrid-measurement scheme. The hybrid-measurement scheme can comprise applying one or more measurements to the quantum circuit that project the quantum circuit toward the target state; and applying one or more adiabatic or non-adiabatic techniques that adiabatically evolve the quantum circuit toward the target state.

20 Claims, 10 Drawing Sheets

ROBUST MAJORANA MAGIC GATES VIA MEASUREMENTS

FIELD

This application relates to quantum computing devices, and, more specifically, π/8 phase gates implemented in a topologically protected system.

SUMMARY

π/8 phase gates (magic gates) are desirable components for augmenting topological systems based on Majorana zero modes to achieve full quantum universality. Disclosed herein are example embodiments of a scheme based on a combination of projective measurements and quantum evolution (e.g., the non-adiabatic evolution) that effectively cancels smooth control errors when implementing phase gates in Majorana-based systems. Previous schemes based on adiabatic evolution are susceptible to problems arising from small but finite dynamical phases that are generically present in topologically unprotected gates. A measurement-only approach eliminates dynamical phases. For non-protected gates, however, forced-measurement schemes are no longer effective, which leads to low success probabilities of obtaining the right succession of measurement outcomes in a measurement-only implementation. In this disclosure, it is shown how to obtain a viable measurement-based scheme that dramatically increases the success probabilities by evolving the system non-adiabatically with respect to the degenerate subspace in between measurements.

In some embodiments, a quantum state of a quantum circuit configured to implement the π/8 phase gate in the quantum computing device is altered from an initial state to a target state using a hybrid-measurement scheme. In the illustrated embodiment, the hybrid-measurement scheme comprises: applying one or more measurements to the quantum state that project the quantum state toward the target state; and, applying one or more adiabatic or non-adiabatic techniques that evolve the quantum state toward the target state.

In certain implementations, the quantum computing device is a topologically-protected-quantum-computing device. In some implementations, the hybrid-measurement scheme reduces timing noise, slow parameter noise, dynamical phase noise, and/or parallel dissipation. In certain implementations, the one or more measurements of the quantum state are applied between application of either (a) two of the non-adiabatic techniques; or (b) two of the adiabatic techniques. In some implementations, the applying of the one or more measurements of the quantum state comprises universal geometric decoupling of the quantum circuit. For example, the universal geometric decoupling can be performed by applying successive projection operators to the quantum circuit. In some examples, the successive projection operators are applied at turning points of a geometric decoupling trajectory, and the turning points are determined using Chebyshev polynomials. In further examples, the universal geometric decoupling of the quantum circuit maps to multiple parameter sweeps across poles of a unit sphere.

Any of the embodiments disclosed above can be implemented as part of a system comprising a quantum computing device comprising a quantum circuit; and a classical computing device in communication with the quantum computing device and adapted to perform any of the disclosed methods.

Any of the embodiments disclosed above can also be implemented by one or more computer-readable media storing computer-exectuable instructions, which when executed by a classical computer cause the classical computer to perform a method of controlling a quantum computing device according to any of the disclosed methods.

The foregoing and other objects, features, and advantages of the disclosed technology will become more apparent from the following detailed description, which proceeds with reference to the accompanying figures.

DETAILED DESCRIPTION

I. General Considerations

Figure 1A:
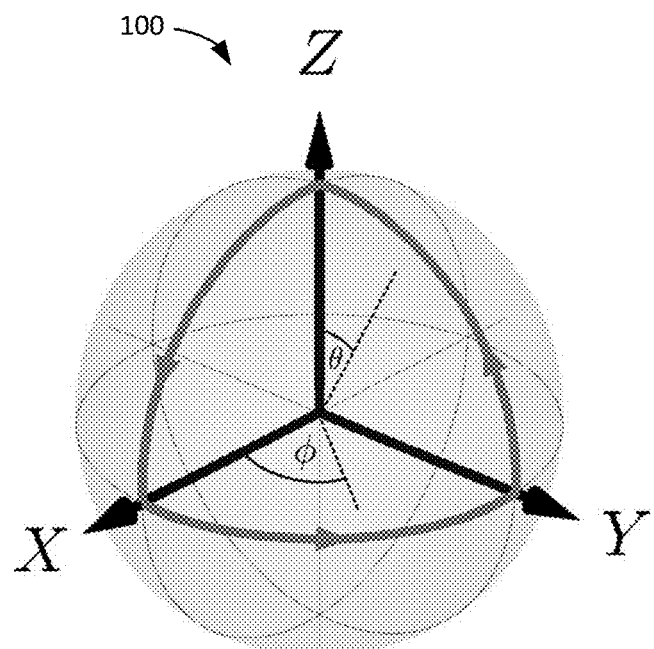
FIG. 1(a) is a schematic block diagram showing a visualization of an exchange process as a line covering an octant of a unit sphere.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Overview

Among the embodiments disclosed herein are new ways of implementing a π/8 gate for quantum computation (also called magic gate or T gate) that eliminates problems with common noise sources that limit other approaches. Embodiments of the scheme disclosed herein employ a combination of measurements and quantum evolution, which are referred to in the following as a hybrid-measurement scheme (HMS). High-fidelity π/8 gates are a valuable ingredient for the majority of universal quantum computation proposals. The HMS will be particularly important for universal topological quantum computation. The current leading approach uses Majorana zero modes (MZMs) to implement high-fidelity Clifford gates but needs to be supplemented by π/8 gates. While a procedure known as magic state distillation can reduce the error of π/8 gates to an arbitrary amount, it requires a significant overhead of physical qubits and trial π/8 states (produced by noisy π/8 gates). See, e.g., S. Bravyi and A. Y. Kitaev, Phys. Rev. A 71, 022316 (2005), quant-ph/0403025. Providing the distillation procedure with high-quality trial π/8 states significantly reduces the overhead and will be of significant practical importance for future implementations of topological quantum computation. By eliminating the leading noise sources of π/8 gates in Majorana-based quantum computing architectures, the HMS can be expected to significantly increase the quality of trial π/8 states compared to all other approaches known today.

A. Noise Sources

The following noise sources can be systematically eliminated by example embodiments of the HMS:

Timing noise. A finite energy splitting of qubits leads to an accumulation of dynamical phase difference over time. Most proposals for π/8 gates rely on a fine-tuning of accumulating a dynamical phase over a certain time interval, thus requiring precise control of the timing and magnitude of the applied energy splitting.

Calibration errors. Calibration errors are systematic and unknown offsets of the control parameters of the system from their intended values.

Slow parameter noise. Even if calibration errors can be avoided by extensive benchmarking and readjusting of the system, time-dependent changes of some of the systems parameters, even if slow, will lead to new calibration errors.

Residual dynamical phase noise. An earlier approach managed to eliminate the above three noise sources. See, e.g., T. Karzig, Y. Oreg, G. Refael, and M. H. Freedman, Phys. Rev. X 6, 031019 (2016), arXiv:1511.05161. The corresponding scheme was based on adiabatically evolving the system and was named universal geometric decoupling. The limitations of this approach are that for Majorana-based systems it is in general not possible to keep the energy splitting of the qubit zero throughout the entire evolution that implements the π/8 gate. This leads to small residual dynamical phases. This earlier approach was aimed at eliminating residual dynamical phase noise using an echo procedure. Nevertheless, timing noise and dissipation will limit the effectiveness of the echo.

Parallel dissipation. Here, environmental noise whose changes to the Hamiltonian are commuting with the original Hamiltonian of the system is denoted as parallel dissipation. This type of noise will lead to a dephasing of the energy eigenstates of the system but not cause transitions between different eigenstates. In a timing-based approach parallel dissipation will lead to a dephasing of the qubit. In T. Karzig, Oreg, G. Refael, and M. H. Freedman, Phys. Rev. X 6, 031019 (2016), arXiv:1511.05161, parallel dissipation will lead to dephasing due to residual dynamical phases. Moreover, parallel dissipation is predicted to increase the time scales required to reach the adiabatic regime (see, e.g., C. Knapp, M. Zaletel, D. E. Liu, M. Cheng, P. Bonderson, and C. Nayak, Phys. Rev. X 6, 041003 (2016), arXiv:1601.05790) which would require longer times to implement the scheme (see, e.g., T. Karzig, Y. Oreg, G. Refael, and M. H. Freedman, Phys. Rev. X 6, 031019 (2016), arXiv:1511.05161).

To date, there is no non-topological or Majorana-based scheme known to be able to systematically eliminate all of the above noise sources. Topological phases that go beyond MZM can in principle avoid the above noise sources. However, to date, the corresponding topological phases have not been experimentally realized with sufficient control to be useful for quantum computation.

B. Outline of the HMS

The details of the HMS are discussed in the sections below. Here, certain concepts of the HMS are described.

The HMS uses universal geometric decoupling to eliminate timing noise, calibration errors and slow parameter noise. Universal geometric decoupling can be thought of as a particularly robust choice of back and forth parameter sweeps with the aim to cancel out the above-mentioned errors. Instead of an adiabatic evolution of the underlying quantum state, the HMS uses measurements that project the system on special points in parameter space (e.g. the turning points of the evolution, as identified in T. Karzig, Y. Oreg, G. Refael, and M. H. Freedman, Phys. Rev. X 6, 031019 (2016), arXiv:1511.05161n Ref.) This allows one to avoid certain intermediate points where the system parameters are unfavorable and would otherwise lead to residual dynamical phase noise.

Performing measurements does not deterministically project onto a specific state. In particular, the proposed measurements have typically two measurement outcomes, with one of them being the outcome that confirms the wanted projection and the other outcome indicating that the projection was onto a different (unwanted) state. Obtaining an unwanted projection is treated as a failure of the π/8 state preparation procedure which would then be restarted. In order to increase the probability of a successful HMS, there is a non-adiabatic Hamiltonian evolution applied to the system, in-between measurements, that rotates the state close to the target state of the measurement projection. This drastically increases the chance of obtaining the wanted measurement outcome. Small errors in the application of this rotation (by timing noise in the non-adiabatic evolution or by parallel dissipation changing the strength of the Hamiltonian) only lead to a small reduction of the probability of performing the wanted projection. Notably, obtaining the wanted projection result will lead to a state that is not affected by the errors in the non-adiabatic Hamiltonian evolution. As a result errors will typically only reduce the success probability of the HMS. However, if the HMS succeeds the resulting π/8 state will be of high quality. In the section below, a discussion is provided that explains that even for relatively large errors in the applied non-adiabatic evolution the success probability of the HMS is still sufficiently large (e.g. of the order of 50%) for practically relevant cancellation protocols that remove a significant amount of the noise sources mentioned in Sec. II A.

The combination of projective measurements to ensure a high fidelity of the resulting state when the wanted measurement outcomes are obtained and non-adiabatic evolution to increase the chance of obtaining the wanted measurement outcomes is unique to the disclosed HMS embodiment. Using this procedure, one can prepare high-quality $\pi/8$ states. In contrast to other existing schemes, embodiments of the HMS scheme can eliminate the error sources listed in Sec. II A. It is therefore a desirable approach for quantum computation platforms that use $\pi/8$ gates.

III. Background and Further Introduction

Topological quantum computation holds the promise for intrinsically error-protected storage and manipulation of quantum information using braiding of non-Abelian anyons. See, e.g., A. Y. Kitaev, "Fault-tolerant quantum computation by anyons," Annals of Physics 303, 2 (2003), quant-ph/9707021. Majorana zero energy modes (MZMs) form the simplest non-Abelian anyons. Formation of such a state in one- and two-dimensions was theoretically predicted to occur in quantum Hall states and certain semiconductor-superconductor devices. See, e.g., N. Read and D. Green, "Paired states of fermions in two dimensions with breaking of parity and time-reversal symmetries and the fractional quantum Hall effect," Phys. Rev. B 61, 10267 (2000), cond-mat/9906453; Y. Kitaev, "Unpaired Majorana fermions in quantum wires," Physics Uspekhi 44, 131 (2001), cond-mat/0010440; J. D. Sau, S. Tewari, R. M. Lutchyn, T. D. Stanescu, and S. Das Sarma, "Non-Abelian quantum order in spin-orbit-coupled semiconductors: Search for topological Majorana particles in solid-state systems," Phys. Rev. B 82, 214509 (2010), arXiv:1006.2829; R. M. Lutchyn, J. D. Sau, and S. Das Sarma, "Majorana Fermions and a Topological Phase Transition in Semiconductor-Superconductor Heterostructures," Phys. Rev. Lett. 105, 077001 (2010), arXiv:1002.4033; Y. Oreg, G. Refael, and F. von Oppen, "Helical Liquids and Majorana Bound States in Quantum Wires," Phys. Rev. Lett. 105, 177002 (2010), arXiv:1003.1145. In the last decade, Majorana modes have indeed emerged in reports of multiple experiments (for a review see R. M. Lutchyn, E. P. A. M. Bakkers, L. P. Kouwenhoven, P. Krogstrup, C. M. Marcus, and Y. Oreg, "Realizing Majorana zero modes in superconductor-semiconductor heterostructures," Nat. Rev. Mater. (2018), arXiv: 1707.04899), which raises the prospects for a Majorana-based topological quantum computer.

MZMs, however, are not intricate enough to permit dense population of the computational Hilbert space and, therefore, can not perform a universal topological quantum computation. See, e.g., S. Bravyi and A. Y. Kitaev, "Universal quantum computation with ideal clifford gates and noisy ancillas," Phys. Rev. A 71, 022316 (2005), quant-ph/0403025. While braiding of MZMs can carry out topologically protected Clifford gates, they are incapable of realizing a topologically-protected magic gate or generating a magic state, (also known as the T-gate or the $\pi/8$ phase gate), which, is necessary to complete the Clifford gates, in order to realize universal quantum computation.

Several proposals exist for augmenting Majorana-based architectures with magic gates. These proposals, however, are generically unprotected, and range from precise timing to fine-tuned geometric approaches. See, e.g., J. D. Sau, S. Tewari, and S. Das Sarma, "Universal quantum computation in a semiconductor quantum wire network," Phys. Rev. A 82, 052322 (2010), arXiv:1007.4204; F. Hassler, A. R. Akhmerov, and C. W. J. Beenakker, "The top-transmon: a hybrid superconducting qubit for parity-protected quantum computation," New J. Phys. 13, 095004 (2011), arXiv: 1105.0315; T. Hyart, B. van Heck, I. C. Fulga, M. Burrello, A. R. Akhmerov, and C. W. J. Beenakker, "Flux-controlled quantum computation with Majorana fermions," Phys. Rev. B 88, 035121 (2013), arXiv:1303.4379; D. J. Clarke, J. D. Sau, and S. Das Sarma, "A Practical Phase Gate for Producing Bell Violations in Majorana Wires," Phys. Rev. X 6, 021005 (2016), arXiv:1510.00007; S. Plugge, L. A. Landau, E. Sela, A. Altland, K. Flensberg, and R. Egger, "Roadmap to Majorana surface codes," Phys. Rev. B 94, 174514 (2016), arXiv:1606.08408; S. Plugge, A. Rasmussen, R. Egger, and K. Flensberg, "Majorana box qutbits," New J. Phys. 19, 012001 (2017), arXiv:1609.01697. An exception is a proposal to develop highly specialized genon-based hardware to produce a topologically protected magic-gate. See, e.g., M. Barkeshli, C.-M. Jian, and X.-L. Qi, "Twist defects and projective non-abelian braiding statistics," Phys. Rev. B 87, 045130 (2013), arXiv:1208.4834; M. Barkeshli and J. D. Sau, "Physical Architecture for a Universal Topological Quantum Computer based on a Network of Majorana Nanowires," (2015), arXiv:1509.07135. In contrast, the current authors proposed a geometric protocol which is robust against systematic errors. See, e.g., T. Karzig, Y. Oreg, G. Refael, and. M. H. Freedman, "Universal Geometric Path to a Robust Majorana Magic Gate," Phys. Rev. X 6, 031019 (2016), arXiv:1511.05161. From a geometric point of view, a $\pi/4$ phase gate that corresponds to an exchange of two MZMs corresponds to a topologically protected adiabatic path encircling an octant in the Bloch sphere of the parameter space, see FIG. 1. By traversing the geometric space in an alternating way, it is possible to implement a geometric decoupling scheme for a $\pi/8$ phase gate which effectively cancels systematic errors so that the remaining error is exponentially small in the number of turns that are properly chosen at zeros of Chebyshev polynomials. T. Karzig, Y. Oreg, G. Refael, and M. H. Freedman, "Universal Geometric Path to a Robust Majorana Magic Gate," Phys. Rev. X 6, 031019 (2016), arXiv:1511.05161. As is reviewed in Sec. IV A, however, unfortunately and unavoidably, leaving the protected path defined by the edge of the octant, the $\pi/8$ gate cannot be realized in a fully geometric way since the system will, in general, pick up a small but finite dynamical phase that has to be eliminated with conventional error correcting protocols (e.g., through echo sequences).

IV. Example Embodiments of the Disclosed Technology

In this disclosure, and in certain example embodiments, elements of measurement-only topological quantum computation are used to overcome these dynamical errors. See, e.g., P. Bonderson, M. Freedman, and C. Nayak, "Measurement-only topological quantum computation," Phys. Rev. Lett. 101, 010501 (2008), arXiv:0802.0279. In this disclosure, a sequence of protocols is demonstrated, starting with a simple measurement-based realization of the geometric magic gate of T. Karzig, Y. Oreg, G. Refael, and M. H. Freedman, "Universal Geometric Path to a Robust Majorana Magic Gate," Phys. Rev. X 6, 031019 (2016), arXiv: 1511.05161, then modifying this sequence with additional measurements, and, finally, combining dynamical evolution and measurements to yield a superior protocol that eliminates systematically all leading sources of error.

On general grounds, one might expect that the measurement-only schemes can perform better than the adiabatic braiding methods as part of the information (the results of the projective measurements) are stored and used classically, and, hence, do not experience any quantum de-coherence effects. To illustrate that, consider four MZMs operators ($\gamma_0$, $\gamma_x$, $\gamma_y$, $\gamma_z$). Using the relation $\{\gamma_i, \gamma_j\}=2\delta_{ij}$, i, j=0, x, y, z. It can be easily checked that with the help of ancillas $\gamma_0$, $\gamma_z$ the braiding operator of $\gamma_x$ and $\gamma_y$ given by $\text{B}_{xy}=e^{\pi/4\gamma_x\gamma_y}$ can be realized by a sequence of projections $$P_z P_y P_x P_z = B_{xy} P_z / \sqrt{8}$$

with $P_i=(1-i\gamma_0\gamma_i)/2$ being the projective measurement operator on the states where the MZM pair $\gamma_0$ and $\gamma_i$ is unoccupied. Since in a typical measurement, the probability of measuring even parity of a pair of MZM, i.e., projecting the pair onto the unoccupied state, equals $\frac{1}{2}$, the total chance for applying the above projectors equals $\frac{1}{2}^3=\frac{1}{8}$. Obtaining other measurement outcomes will, in general, create a different gate which might require suitable corrections depending on the outcomes. An alternative is to use a forced-measurement scheme in which a pair of measurement processes is repeated until the desired measurement outcomes are obtained. See, e.g., P. Bonderson, M. Freedman, and C. Nayak, "Measurement-only topological quantum computation," Phys. Rev. Lett. 101, 010501 (2008), arXiv: 0802.0279.

The structure of this disclosure is as follows. In Sec. IV B1, a modification of the adiabatic geometric decoupling scheme to a measurement-only procedure is described. The application of successive projection operators at the turning points of the geometric decoupling trajectory of the adiabatic scheme is discussed. The measurement-only scheme allows one to avoid the situation where all Majorana couplings are significant, which is where dynamical phases are accrued. While this removes the need for an echo error correction, the success probability in this scheme becomes dependent on the state of the qubit, and leads to small deviations from the desired phase gate. In Sec. IV B2, it is shown how these deviations can be avoided through a forced-measurement echo procedure, reminiscent of the dynamical phase cancellation echo for the adiabatic scheme. In Sec. IV B3, a north/south projection protocol is discussed that eliminates the need for echo procedures, and renders an accurate magic gate, but with a success probability fall off as $2^{-N}$, where N is the number of steps in the geometric decoupling protocol. Since only successful outcomes are fed into a subsequent distillation scheme small success probabilities are, in principle, not problematic. Increasing the success probability, however, will drastically reduce the time to prepare a magic state.

Embodiments of the disclosed technology provide a protocol that combines dynamical evolution with measurement steps. In Sec. IV C, it is shown that a novel hybrid evolution/measurement approach raises the success probability to O(1), while also producing an accurate high-quality phase gate.

Sec. IV D is devoted to numerical implementation of the hybrid evolution exemplifying the various methods discussed in Secs. IV B and IV C. In Sec. IV E, a summary is provided.

A. Review of Geometric Decoupling

The main problem of realizing a robust magic gate is the need for extreme fine tuning of the qubit Hamiltonian. Despite their topological protection, MZMs are no exception. MZMs, however, offer a relative advantage over non-topological qubits since it is possible to exploit geometric phases. Below, the geometric procedure for obtaining a magic state using MZMs is reviewed, including the leading pitfalls of the procedure and how to use a universal geometric-decoupling procedure to overcome the bulk of the errors. See, e.g., T. Karzig, Y. Oreg, G. Refael, and M. H. Freedman, "Universal Geometric Path to a Robust Majorana Magic Gate," Phys. Rev. X 6, 031019 (2016), arXiv: 1511.05161.

The geometric path to a magic gate is best illustrated with a Y-junction system. Three Majorana modes, $\gamma_x$, $\gamma_y$ and $\gamma_z$, are located at the tips of the Y-junction and interact only with the fourth MZM, $\gamma_0$, which is at the center of the junction, with Hamiltonian:

$$H = i\frac{\omega}{2}\gamma_0(h \cdot \gamma), \tag{1}$$

where the following definitions are applied: Majorana vector $\gamma=(\gamma_x, \gamma_y, \gamma_z)$ and the coupling unit vector $h=(h_x, h_y, h_z)$. The Y-junction couplings, $\omega h_i$, depend exponentially on physical parameters, such as the distance between the MZMs, or gate-controlled confining potentials (see e.g. B. van Heck, A. R. Akhmerov, F. Hassler, M. Burrello, and C. W. J. Beenakker, "Coulomb-assisted braiding of Majorana fermions in a Josephson junction array," New J. Phys. 14, 035019 (2012), arXiv:1111.6001; T. Karzig, C. Knapp, R. M. Lutchyn, P. Bonderson, M. B. Hastings, C. Nayak, J. Alicea, K. Flensberg, S. Plugge, Y. Oreg, C. M. Marcus, and M. H. Freedman, "Scalable designs for quasiparticle-poisoning-protected topological quantum computation with Majorana zero modes," Phys. Rev. B 95, 235305 (2017), arXiv: 1610.05289). This motivates the fundamental assumption in this paper that these couplings can be tuned so that their ratios reach 0 or $\infty$ with exponential accuracy.

1. Exchange Process and its $\pi/8$ (Magic) Generalization

An exchange process of MZMs in this system can be implemented by tuning the strengths of the couplings $\omega h_i$. Start with $h_z \approx 1 \gg h_x$, $h_y$. $\gamma_x$ and $\gamma_y$ are then zero modes of the problem. To exchange them, move to $h_z \approx 1 \gg h_z$, $h_y$ in a continuous fashion while keeping $h_y \ll 1$. Followed by $h_y \approx 1 \gg h_x$, $h_z$ (while keeping $h_z \ll 1$) and finally returning the system to its original state $h_z \gg h_x$, $h_y$ (while keeping $h_z \ll 1$).

Such manipulations can be geometrically visualized. Let us think of h as a 3D vector, and represent it with spherical coordinates. See, e.g., C.-K. Chin, M. M. Vazifeh, and M. Franz, "Majorana fermion exchange in strictly one-dimensional structures," EPL 110, 10001 (2015), arXiv: 1403.0033. h is then the radius-vector, and the polar and azimuthal angles $\theta$ and $\phi$ are used as well as their unit vectors $e_\theta$ and $e_\phi$. With this, the Majorana states $$\gamma_\theta = \gamma \cdot e_\theta, \gamma_\phi = \gamma \cdot e_\phi, \tag{2}$$

are zero modes which commute with the Hamiltonian (1). The exchange process is now easily visualized as h marking a unit-sphere octant, bounded between the $\phi=0$, $\theta=\pi/2$ and $\phi=\pi/2$ planes. (see FIG. 1(a)).

The effect of such adiabatic manipulations on the state of the two zero modes is encapsulated in the Bloch sphere Berry phase that the h demarcates. Writing a single Fermi annihilation operator from the two zero modes as $$a = \frac{1}{2}(\gamma_\theta + i\gamma_\phi). \tag{3}$$

This operator connects two parity states $|0\rangle$ (defined by $a|0\rangle=0$, and $a^\dagger|0\rangle=|1\rangle$). Upon adiabatic closed manipulation of the vector h, these states change as:

$$U_c|(1\pm1)/2\rangle = e^{\pm i\alpha}|(1\pm1)/2\rangle, \tag{4}$$

where the phase difference $2\alpha$ is given by the solid angle enclosed by the demarcated contour. For an octant, one can obtain $\alpha_{exchange}=\pi/4$.

Obtaining the magic $\pi/8$ gate now seems palpable. All one needs is to cover half the solid angle that the exchange process covers. For instance, one could start with $\theta=\phi=0$, turn $\theta=0\to\pi/2$, then $\phi=0\to\pi/4$, and return with $\theta=\pi/2\to 0$. Finally, $\phi=\pi/4\to 0$ closes the trajectory (see FIG. 1(b)).

More specifically, FIG. 1(a) is a schematic block diagram 100 showing a visualization of the exchange process as a line covering an octant of the unit sphere. The line starts at the north pole ($h_z \gg h_x, h_y$), then proceeds to the X point on the equator ($h_x \gg h_y, h_z$), followed by the Y point ($h_y \gg h_x, h_z$) and finally reaches the north pole again ($h_z \gg h_x, h_y$), so that the cycle is completed. The Berry phase difference of the two parity sectors accumulated in this process is equal to half of the covered solid angle, $\pi/2$.

Figure 1B:
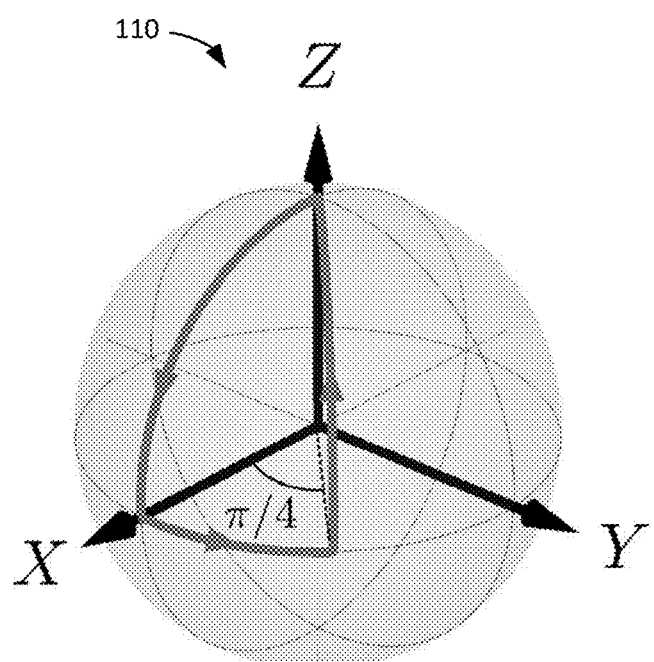
FIG. 1(b) is a schematic block diagram showing a visualization of a sequence for a π/8 gate in an ideal Y-junction system.

FIG. 1(b) is a schematic block diagram 110 showing a visualization of the sequence for a $\pi/8$ gate in the ideal Y-junction system. This trajectory is not protected, as one has to keep $h_z=h_y$ while modifying $h_z$, small fluctuations will yield a different phase.

Despite the elegance of the geometric magic gate, it suffers a notable pitfall. The $\phi=\pi/4$ plane is a fine tuned swath of parameter space, which requires keeping $h_x=h_y$. But such control is not realistic, and control errors will lead to an arbitrary error in the computation. Additionally, the $\pi/8$ trajectory desirably goes through a region where all three Majorana couplings have similar strengths ($\theta=\phi=\pi/4$). This will unavoidably induce next-nearest-neighbor coupling between the Majorana modes at the Y-junction tip, which will split the ground-state degeneracy between the two parity states, and induce an arbitrary dynamical phase between the $|0\rangle$ and $|1\rangle$ states. In the following, reference will be made to direct coupling between the MZMs, $\gamma_x$, $\gamma_y$, and $\gamma_z$ as outer couplings.

2. Universal Geometric Decoupling

Figure 2:
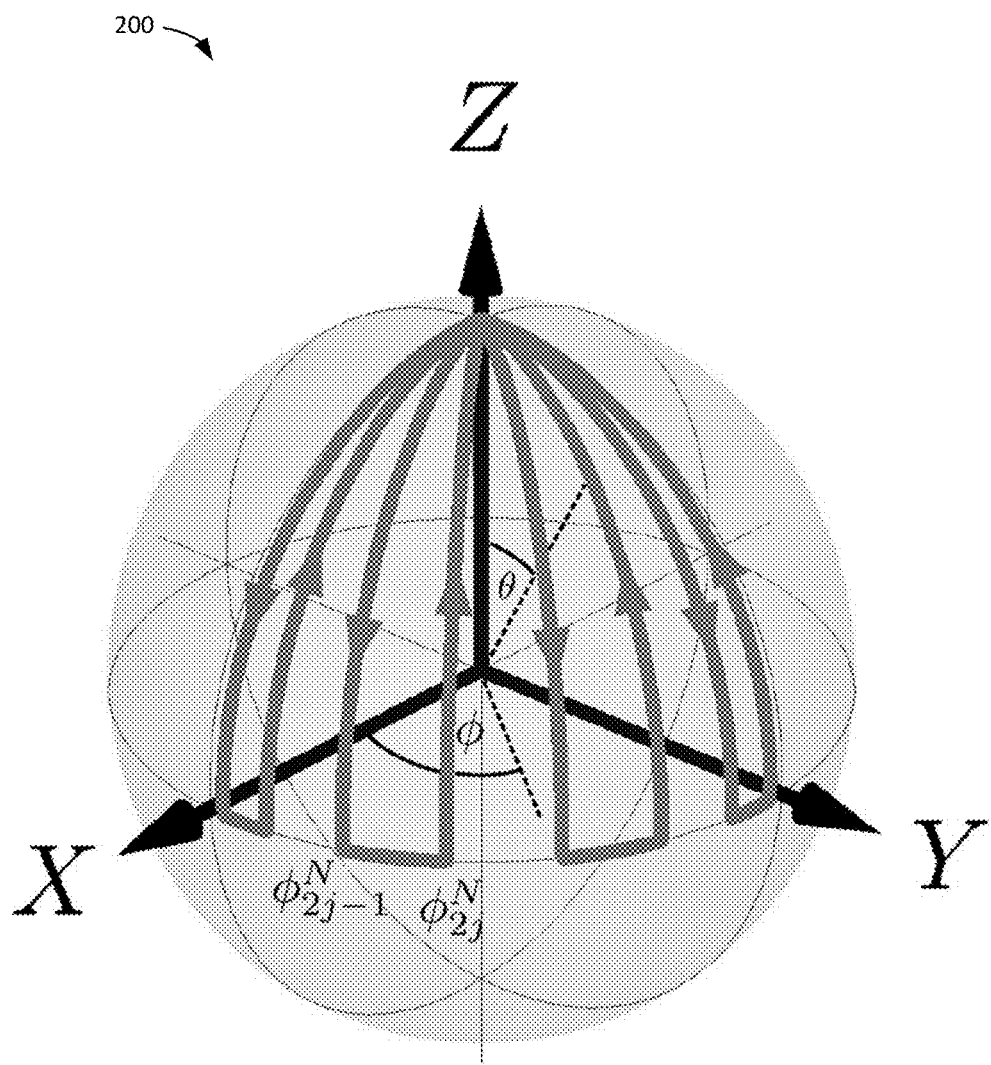
FIG. 2 is a schematic block diagram illustrating an evolution-based geometric decoupling scheme.

The crux of T. Karzig, Y. Oreg, G. Refael, and M. H. Freedman, "Universal Geometric Path to a Robust Majorana Magic Gate," Phys. Rev. X 6, 031019 (2016), arXiv: 1511.05161 is to show that the systematic control error described above could be eliminated to arbitrary precision using an iterative and universal trajectory through the h sphere. The idea follows from the intuition that snake-like trajectories as in FIG. 2 could essentially average out the error that arises from the imperfect control of the device. The turning points $\phi_1^N, \phi_2^N, \ldots, \phi_n^N$, $n=1, \ldots, 2N$ can be optimized to systematically eliminate the error in the accumulated phase reminiscent to the concept of universal dynamical decoupling. (See, e.g., G. S. Uhrig, "Keeping a quantum bit alive by optimized pulse sequences," Phys. Rev. Lett. 98, 100504 (2007), quant-ph/0609203.) More specifically, FIG. 2 is a schematic block diagram 200 illustrating an evolution-based geometric decoupling scheme. A proper choice of the turning point $\phi_n^N$ yields a trajectory covering a solid angle of $\pi/4$ with an exponentially small error. Here, the contour is plotted for the Chebyshev polynomials with N=5 and $\phi_n^N$, n=1, . . . , 2N are given in Eq. (6).

In particular, is becomes possible to exponentially suppress gate errors in the number of turns $\delta\alpha \sim e^{-2N}$, as long as the errors in the turning points $\delta\phi_n^N$ are systematic and described by a smooth function $\delta\phi_n^N = \delta\phi(\phi_n^N)$. The optimal turning points can then be derived by expanding the errors in terms of Chebyshev polynomials and eliminating the first 2N−1 orders of the expansion. See T. Karzig, Y. Oreg, G. Refael, and M. H. Freedman, "Universal Geometric Path to a Robust Majorana Magic Gate," Phys. Rev. X 6, 031019 (2016), arXiv:1511.05161. This procedure yields 2N equations $$\sum_{n=1}^{2N} (-1)^n T_m^*\left(\frac{2}{\pi}\phi_n^N\right) = \frac{4}{\pi}\alpha(1-(-1)^m), \tag{5}$$

with m=1 . . . 2N where $T_m^*(x)=T_m(2x-1)$ are shifted Chebyshev polynomials of the first kind. A magic gate is implemented for $\alpha=\pi/8$. In that case, the solutions $\phi_n^N$ can be expressed analytically and are given by $$\phi_n^N = \frac{\pi}{4}\left[1 - \cos\left(\frac{\pi n}{2N+1}\right)\right]. \tag{6}$$

The Chebyshev protocol, while efficiently eliminating the systematic machine error, does not solve the problem of the uncontrollable dynamical phase due to finite outer couplings that arise when all the couplings $h_i$ are strong. In T. Karzig, Y. Oreg, G. Refael, M. H. Freedman, "Universal Geometric Path to a Robust Majorana Magic Gate," Phys. Rev. X 6, 031019 (2016), arXiv:1511.05161, it was illustrated how this dynamical phase can be eliminated by carrying out an echo sequence. Echo sequences, however, could prove costly, as they lengthen the calculation time, and rely strongly on the stability of the system. Much current work seeks to eliminate the need for an echo altogether by avoiding the regions where all three couplings $\omega h_i$ are sizable. This can be done using a measurement-based approach as is shown below.

B. Measurement-Only Approach

In a measurement-only approach, the adiabatic evolution of the state is replaced by applying a set of measurements. (See, e.g., P. Bonderson, M. Freedman, and C. Nayak, "Measurement-only topological quantum computation," Phys. Rev. Lett. 101, 010501 (2008), arXiv:0802.0279.) Here, the focus is on measurements that determine the (joint) parity of a set of MZMs. With the knowledge of a measurement outcome a measurement can be described by projectors $P_p$ or $P_{\bar p}$, where p denotes the parity of the selected set of MZMs and one can define $P_p(P_{\bar p})$ as the projection onto p=1 (p=−1). A series of measurements then acts on an initial state $|\psi\rangle$ as a product of projectors yielding the (normalized) final state $p_s^{-1/2}\Pi_j P_j|\psi\rangle$ where $p_s$ denotes the probability of obtaining the specific set of measurement outcomes.

Figure 3A:
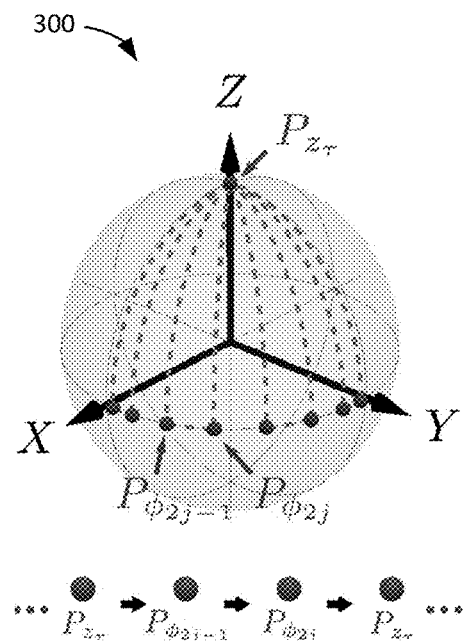
FIGS. 3(a) and 3(b) are schematic block diagrams illustrating measurement-only geometric decoupling schemes.
Figure 3B:
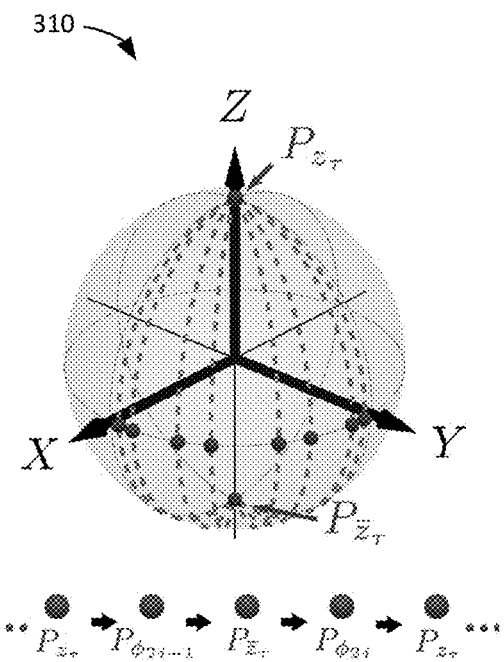

1. Direct Translation of Evolution-Based to Measurement-Only Geometric Decoupling FIGS. 3(a) and 3(b) are schematic block diagrams 300, 302 illustrating measurement-only geometric decoupling schemes. The projection operators are applied in order indicated below each panel. FIG. 3(a) illustrates a direct translation of the evolution based scheme in FIG. 2 to a measurement-only implementation. FIG. 3(b) illustrates a measurement-only implementation of the north/south sweep protocol.

Let's now return to the 4 MZM system discussed in Sec. IV A. The evolution-based geometric decoupling scheme can be translated into a measurement-only protocol by applying projectors at all the turning points of the adiabatic evolution along the Bloch sphere (see FIG. 3). In particular, the evolution from the north pole to equator at azimuthal angle $\phi_{2j-1}$, along the equator to $\phi_{2j}$, and back to the north pole is described by a set of projectors $\Pi_{\phi_{2j}-\phi_{2j-1}} \equiv P_{z_\tau} P_{\phi_{2j}} P_{\phi_{2j-1}} P_{z_\tau}$, with $$2P_{z_\tau} = 1 - i\gamma_0 \gamma_z \quad (7)$$

$$2P_\phi = 1 - i\gamma_0 [\cos(\phi)\gamma_x + \sin(\phi)\gamma_y]. \quad (8)$$

In the following, it will be convenient to rewrite pairs of MZMs in terms of Pauli matrices $\sigma_j$ as $i\gamma_0\gamma_x = \sigma_x$, $i\gamma_0\gamma_y = \sigma_y$ and $-i\gamma_x\gamma_y = \sigma_z$. Note that $i\gamma_0\gamma_z = \sigma_z\tau_z$ where the Pauli matrix $\tau_z = -\gamma_x\gamma_y\gamma_z\gamma_0$ describes the overall parity of the 4 MZM system. For concreteness, consider the case of a system with 6 MZMs at a fixed (even) parity—where a qubit is encoded in the 4 MZMs $\gamma_x, \gamma_y, \gamma_1, \gamma_2$ with $\gamma_0, \gamma_z$ acting as ancillas. In this case $\tau_z = i\gamma_1\gamma_2$ describes the z-Pauli operator of the qubit.

In this notation, one finds $$\Pi_{\Delta\phi} = \frac{1}{4} P_{z_\tau}(1 + \cos(\Delta\phi) - i\sin(\Delta\phi)\sigma_z) \quad (9)$$

$$= \frac{1}{2}\cos(\Delta\phi/2) e^{i\tau_z \Delta\phi/2} P_{z_\tau}, \quad (10)$$

here $P_{z_\tau}$ projects onto the space where $\sigma_z = -\tau_z$. Equation (10) allows to group the effect of the set of projectors $\Pi_{\Delta\phi}$ into three different contributions: (1) The projector $P_{z_\tau}$ fixes the state of the ancillary ($\sigma$) degree of freedom. (2) The unitary operator $\exp(i\tau_z\Delta\phi/2)$ acts as a phase gate on the qubit ($\tau$) degree of freedom. The origin of the phase gate stems from picking up different geometric phases when completing a cyclic path in the ancillary ($\sigma$) Bloch sphere. Depending on whether $\tau_z = +1(-1)$ the path starts and ends at the north (south) pole. The opposite geometric phases $\pm\Delta\phi/2$ of the two cases then act as a phase gate. (3) The prefactor describes the success probability $\cos^2(\Delta\phi/2)/4$ of obtaining the measurement results.

Note that the phase gate that is implemented by $\Pi_{\Delta\phi}$ is the same as that of the adiabatic evolution along the geodesics connecting the projection points on the Bloch sphere. This correspondence allows to implement the same geometric decoupling scheme of Sec. IV A in a measurement-only setting. The full $\pi/8$ gate would then be implemented by $\Pi_{j=1}^{N}\Pi_{\phi_{2j}-\phi_{2j-1}}$. There is, however, an important difference: only a specific set of measurement outcomes yields the individual projectors $\Pi_{\phi_{2j}-\phi_{2j-1}}$.

Now, this disclosure studies the resulting operation for different measurement outcomes. The effect of flipping $P_\phi \to P_{\bar\phi} = P_{\phi+\pi}$ is relatively minor. If both angles are shifted by $\pi$, one still obtains the same gate. If only one angle is shifted the gate differs by an overall $\tau_z$ gate which can easily be recorded and (if needed) corrected. Problems would arise if the z projections shift $P_{z_\tau} \to P_{\bar z_\tau}$. The latter would lead to random sign flips $\exp(\pm i\tau_z\Delta\phi/2)$. To avoid this issue, one could use forced measurements (see, e.g., P. Bonderson, M. Freedman, and C. Nayak, "Measurement only topological quantum computation," Phys. Rev. Lett. 101, 010501 (2008), arXiv:0802.0279) by repeating the the measurements along the axis of $\phi_i$ and $z_\tau$ until one finds $z_\tau = +1$. Note that different paths in the course of this correction procedure only lead to phase differences that are multiples of $2\pi$ which can be ignored (Compare, e.g., the geometric phases of the path through the points $(z_\tau, \phi) = (0, \phi_{2j-1}) \to (+1, \phi_{2j-1})$ with $(0, \phi_{2j-1}) \to (-1, \phi_{2j-1}) \to (0, \phi_{2j-1}+\pi) \to (+1, \phi_{2j-1})$.) The forced-measurement procedure, therefore, allows to increase the success probability of the entire measurement protocol from $2^{-N}$ to unity.

2. Effect of Outer Couplings

One of the motivations of employing a measurement-based scheme to implement geometric decoupling is that by using projections instead of adiabatic time evolution it is possible to avoid the middle region of the octant where all $\omega h_i$ Majorana couplings are turned on. As mentioned in Sec. IV A the danger of that regime is that unavoidable second-order couplings between "outer" MZMs (e.g. between $\gamma_x$ and $\gamma_y$) lead to a splitting of the degeneracy of the qubit states. The accompanying dynamical phases then have to be canceled by an extra echo procedure.

Dynamical phases do not appear when applying projectors of the type of Eq. (10) since there is always at least one MZMs that is untouched and therefore guaranties a perfect ground state degeneracy. The outer couplings, however, can lead to a different error source by applying modified projectors $$2P_{\phi,\vartheta} = 1 - \gamma_0 \cos(\vartheta)[\cos(\phi)\gamma_x + \sin(\phi)\gamma_y] - i\sin(\vartheta)\gamma_x\gamma_y \quad (11)$$

instead of $P_\phi = P_{\phi,\vartheta=0}$. This form of projectors emerges when considering how to physically implement the corresponding measurements. A measurement of MZM parities can be thought of as a two step process. First, the four-fold ground state degeneracy is split (once) by introducing couplings between MZMs either internally or through coupling to the measurement apparatus. This process is described by a Hamiltonian $H_M$. The finite energy splitting then allows the measurement apparatus to determine whether the system is in the ground or excited state by an appropriate energy spectroscopy. In the following, a measurement is described involving turning on a Hamiltonian $H_M$ and then projecting onto the corresponding energy eigenstates.

Measurements of the form (11) are implemented by the Hamiltonian $$H_M = i\frac{\omega}{2}[\cos(\vartheta)(\cos(\phi)\gamma_0\gamma_x + \sin(\phi)\gamma_0\gamma_y) + \sin(\vartheta)\gamma_x\gamma_y], \quad (12)$$

where $\tan(\vartheta)$ quantifies the ratio of the outer to inner couplings. While it is in principle possible to fine-tune to $\vartheta = 0$, in general one expects a second order coupling $\sin(\vartheta) \sim \cos(\phi)\sin(\phi)\omega/\Delta_0$ where $\Delta_0$ is a higher energy scale (e.g. the topological gap) that was integrated out to obtain the effective MZM Hamiltonian $H_M$.

The effect of a finite $\vartheta$ is that $P_{\phi,\vartheta}$ no longer projects directly onto the equator of the $(\sigma_x, \sigma_y, \sigma_z\tau_z)$ Bloch sphere, but rather onto points shifted a little to the north or south. Interestingly, since these shifts are opposite for different states of the $\tau_z$ qubit, they do not affect the geometric phase that is picked up when applying $\Pi_{\delta\phi,\{\vartheta\}} = P_{z_\tau} P_{\phi_{2j},\vartheta_{2j}} P_{\phi_{2j-1},\vartheta_{2j-1}} P_{z_\tau}$. In particular, to linear order in $\{\vartheta_{2j}, \vartheta_{2j-1}\}$ one finds (up to an overall phase)

$$\Pi_{\delta\phi,\{\vartheta\}} = (1-\bar{\vartheta}_{\tau_z})\Pi_{\delta\phi}, \quad (13)$$

with $\bar{\vartheta} = (\vartheta_{2j} + \vartheta_{2j-1})/2$. While a finite $\bar{\vartheta}$ does not change the applied lease rotation, the (real) prefactor now becomes $\tau_z$ dependent. The latter follows intuitively from different success probabilities of the projections since depending on the state of the $\tau_z$ qubit, the projection $P_{\phi,\vartheta}$ is either closer to or further away from the north pole. Unfortunately, due to the presence of a $\tau_z$ dependent prefactor, projections of the type of Eq. (13) can no longer be used to prepare precise magic states. Since X eigenstates $(|0\rangle + |1\rangle)/\sqrt{2}$ can be prepared with topological accuracy a precise way of preparing a magic state is applying a $\pi/8$ phase gate to initial X states. Applying a gate of the form $(1-\bar{\vartheta}_{\tau_z})\exp(i\tau_z\pi/8)$ would rotate X states out of the equator and introduce errors.

Note that an additional echo similar to the one that cancels the dynamical phases in the evolution-based scheme could be used to cancel the $\tau_z$ dependent prefactor: First, apply the geometric decoupling protocol to implement a $\pi/16$ phase gate with some unwanted overall prefactor $(1-\bar{\vartheta}_{\tau_z})$. Then, use the forced measurement scheme to protect on the south instead of the north pole and reverse the order of the turning points to still implement a $\pi/16$ gate (this step is equivalent to flipping the qubit and applying a $-\pi/16$ gate). The result will be a $\pi/8$ gate where the $\tau_z$ dependence in the prefactor was eliminated via $(1-\bar{\vartheta}_{\tau_z})(1+\bar{\vartheta}_{\tau_z}) = 1-\bar{\vartheta}^2$ for each turn.

3. North/South Projection Protocol

Within the protocols discussed in Secs. IV B1 and IV B2, the evolution and measurement-only approaches are very similar, with essentially a one-to-one mapping of their strengths (eliminating systematic errors) and weaknesses (requiring some sort of echo procedure). Now, a different protocol is presented that allows a measurement-only scheme to eliminate the effect of unwanted outer couplings without the need for extra echos.

The minimal building block of the protocol is given by $\Pi_{\Delta\phi,\{\varepsilon\}}^{ns} = P_{z_\tau} P_{\phi_{2j},\vartheta_{2j}} P_{z_\tau} P_{\phi_{2j-1},\vartheta_{2j-1}} P_{z_\tau}$ and describes projections in the Bloch sphere from north to south and back (see FIG. 3(b)). Since any projector $P_{\phi,\vartheta}$ is enclosed by antipodal projections in Z direction only terms that do not commute with $\sigma_z \tau_z$ survive which cancels the unwanted terms $i\gamma_x \gamma_y = -\sigma_z$. The resulting projection yields $$\Pi_{\Delta\phi,\{\vartheta\}}^{ns} = \frac{1}{4}\cos(\vartheta_1)\cos(\vartheta_2) P_{z_\tau} \sigma_x e^{i\sigma_z\phi_2} P_{z_\tau} \sigma_x e^{i\sigma_z\phi_1} P_{z_\tau} \quad (14)$$

$$= \frac{1}{4}\cos(\vartheta_1)\cos(\vartheta_2) e^{i\tau_z\Delta\phi} P_{z_\tau} \quad (15)$$

with $\Delta\phi = \phi_2 - \phi_1$. The implemented gate has the same form as the version with $\vartheta = 0$ of Eq. (10), with the difference that the accumulated phase is now doubled. One can, therefore, use a succession of projections $\Pi_{\Delta\phi,\{\vartheta\}}^{ns}$ to implement the full geometric decoupling scheme when choosing turning points suitable for a $\pi/16$ gate in the original protocol (e.g., using solutions of Eq. (5) with $\alpha = \pi/16$). Conceptually, a similar procedure would also be possible in an adiabatic-evolution based scheme. The requirements for the control of the Hamiltonian to achieve the desired cancellation of dynamical phases are, however, much harder to meet. One would need to change the sign of the Z component of the Hamiltonian while keeping the X and Y parts exactly the same as for the evolution through the northern hemisphere. For the measurement-only version, projecting onto the north or south pole corresponds to applying exactly the same measurements; one simply can select for different measurement outcomes.

As one can see from Eq. (15), the effect of finite angles $\vartheta_i$ is minimal, as it simply slightly reduces the success probability of the set of measurement outcomes. Similar to Sec. IV B1, the protocol works with any outcome of the measurements along the equator. Here, one need not record the outcomes since the corresponding paths only differ by great circles, and thus by phases of $2\pi$. Measurement outcomes, however, do matter for measurements along the Z axis and completing the progression from north→south→north has a likelihood of $\frac{1}{4}$ (for $\vartheta = 0$).

Obtaining the wrong measurement outcomes leads to contributions $P_{z_\tau} P_{\phi,\vartheta} P_{z_\tau} = (\cos(\vartheta) - \sin(\vartheta)\tau_z) P_{z_\tau}/2$ which reintroduce the unwanted $\tau_z$ dependent prefactors. This prevents an efficient implementation of a forced-measurement scheme since the $\tau_z$ dependent terms of wrong measurement outcomes would need to be appropriately canceled. Nevertheless, with a probability $2^{-2N}$ the protocol yields an implementation of the geometric decoupling scheme that does not suffer from the effects of unwanted couplings and with the recorded outcomes of the measurement along the Z axis it is also known when this scenario was realized. In the next section, a discussion is provided as to how to drastically increase the probability of obtaining the right measurement outcomes by utilizing a hybrid evolution-measurement scheme.

Figure 4:
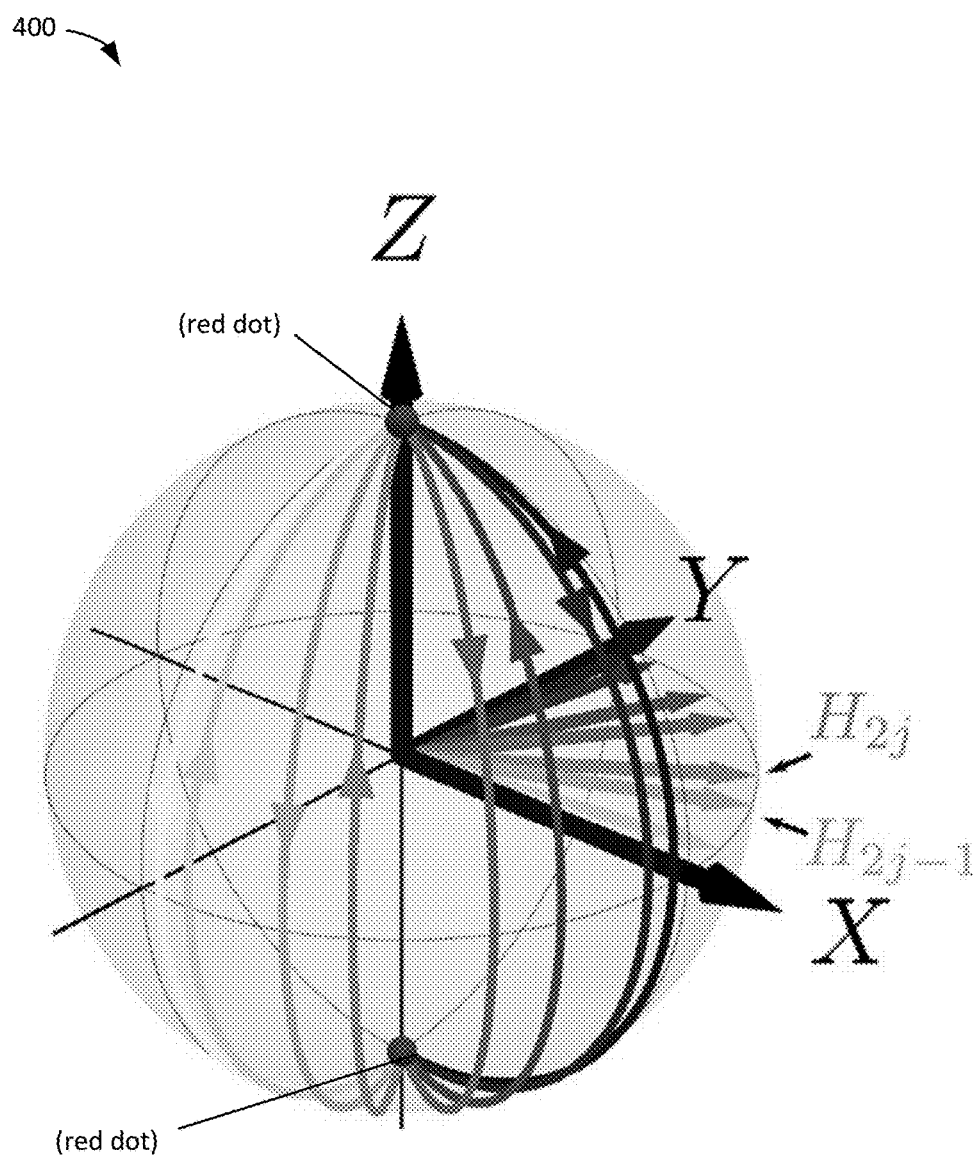
FIG. 4 is a schematic block diagram illustrating a visualization of an example hybrid protocol.

FIG. 4 is a schematic block diagram 400 illustrating a visualization of the hybrid protocol. The lines indicate the evolution of the state while the arrows of the same color indicate the corresponding Hamiltonian terms $H_{2j-1}$ and $H_{2j}$ that drive the precession. For illustrative purposes, the back-evolution is illustrated from the south to the north pole shifted by $\pi$ corresponding to applying $-H_{2j}$. The sign of H does not matter since it leads to phase differences of $2\pi$. At the end of each evolution stage a projection, with high success probability, is performed to the south or north pole as indicated by the red dots.

C. Hybrid Evolution and Measurement Scheme

By combining measurements with dynamical evolution of the system, one can obviate the problem of low success probabilities of the measurement-only north/south projection scheme. In this proposed procedure, the projective measurements along the north and south poles are supplemented by a free (non-adiabatic) evolution which shifts the state of the four MZMs between the two poles. By combining the measurement with the free evolution, one can dramatically reduce the probability of measurement errors, as well as eliminate the possibility of static machine error (e.g., the $\theta \neq 0$ case from from Eq. (11)).

An example embodiment of the procedure is as follows. Just as in the measurement-only procedure, one can break the evolution into a series of wedges flowing from the north pole to the south pole and back through the azimuthal angles $\phi_{2j-1}$ and $\phi_{2j}$, respectively. The procedure for the jth wedge begins by projecting the qubit into its north pole, $P_{z_\tau}$. Next, ideally, one evolves the qubit with the Hamiltonian:

$$H_j = \frac{\omega}{2} i \gamma_0 (\gamma_x \cos\phi_j + \gamma_y \sin\phi_j) \quad (16)$$
$$= \frac{\omega}{2} h_{\phi_j} \cdot \sigma$$

with $h_{\phi_j} = \{\cos(\phi_j), \sin(\phi_j), 0\}$ and $\sigma = \{\sigma_x, \sigma_y, \sigma_z\}$. Note that in contrast to adiabatic evolution schemes the system starts out with all couplings turned off after the projection to then north pole. Turning on the above Hamiltonian is, therefore, non-adiabatic and acts like a perpendicular magnetic field in which the "spin" of the qubit Bloch sphere freely precesses. This precession will evolve the state from the north pole along the great arch intersecting the equator at $\phi_j - \pi/2$ until it reaches the south pole where $P_{\bar{z}}$ should be measured to be 1. For this purpose, one can turn the Hamiltonian (16) on for a time $T = \pi(1+2n)/\omega$. It may appear as though this time has to be fine tuned, but that is not the case. The measurement that follows will align the qubit with south pole precisely which corrects over or under rotation. As is shown below, the main virtue of a precise adjustment of the free precession time is an increase of the success probability of the process. After the projection to the south pole, one can apply the Hamiltonian $$H_{j+1} = -\frac{\omega}{2} (\cos\phi_{j+1} \sigma_x + \sin\phi_{j+1} \sigma_y) \quad (17)$$

for a time $T = \pi(1+2n')/\omega$. This will return the qubit to the vicinity of the north pole, where a measurement in the Z basis will lead to a likely projection onto $P_{z_\tau}$. Note that the minus sign in Eq. (17) is not necessary and was chosen for convenience to align with the wedges in FIG. 4. Shifting $\omega \to -\omega$ leads to an essentially equivalent path that differs by a phase of $2\pi$.

Now, consider calculating the evolution of the qubit state during the above one-wedge process. The operator applied to the qubit state reads, in terms of the Pauli matrices:

$$\Pi^{hyb} = P_{z_\tau} e^{-iTH_{j+1}} P_{\bar{z}} e^{-iTH_j} P_{z_\tau} \quad (18)$$

At this point, it can be assumed that the Hamiltonian $H_j$ is not perfect, and has a small component of $i\gamma_x\gamma_y = \sigma_z$ mixed in it, due to unavoidable outer couplings as in Eq. (12):

$$H_j = \frac{\omega}{2} [\cos\vartheta_j (\cos\phi_j \sigma_x + \sin\phi_j \sigma_y) + \sin\vartheta_j \sigma_z] \quad (19)$$

and similarly for any j.

One aspect of this approach relies on the projections on the north and south poles before and after free evolution. Only the free evolution portion which flips $\sigma_z$ survives the measurement. By using $e^{-iT_jH_j} = \cos(\omega T_j/2) - i h_j \cdot \sigma \sin(\omega T_j/2)$ one can obtain:

$$\Pi^{hyb} = P_{z_\tau} \sin(\omega T_{j+1}/2) \cos\vartheta_{j+1} (\cos\phi_{j+1}\sigma_x + \sin\phi_{j+1}\sigma_y) \\ P_{\bar{z}} \sin(\omega T_j/2) \cos\vartheta_j (\cos\phi_j\sigma_x + \sin\phi_j\sigma_y) P_{z_\tau} \quad (20)$$

which reduces further to:

$$\Pi^{hyb} = \sin(\omega T_j/2)\sin(\omega T_{j+1}/2) \cos\vartheta_{j+1}\cos\vartheta_j P_{z_\tau}[(\cos\phi_{j+1}\cos\phi_j + \sin\phi_{j+1}\sin\phi_j) + i\sigma_z(\cos\phi_{j+1}\sin\phi_j - \sin\phi_{j+1}\cos\phi_j)] \quad (21)$$

And finally:

$$\Pi^{hyb} = p_{j,j+1} P_{z_\tau} e^{i\tau_z(\phi_{j+1}-\phi_j)}, \quad (22)$$

with $$p_{j,j+1} = \sin(\omega T_j/2)\sin(\omega T_{j+1}/2)\cos\vartheta_{j+1}\cos\vartheta_j \quad (23)$$

where $P_{z_\tau}$ projecting onto $\tau_z \tau_z = -1$ was used. So, one can obtain that the state of the qubit only enters as a phase shift $\tau_z(\phi_{j+1} - \phi_j)$. One can thus observe that the hybrid protocol allows to implement the same projectors as in a measurement-only approach (see Eq. (15)) but with the advantage of an increased success probability. This enables an implementation of the full Chebyshev protocol as discussed in Sec. IV B3 with a much higher probability which supports a reasonable numbers of turning points (see simulations in Sec. IV D).

As mentioned above, no fine tuning is required to obtain the precise phase rotation. Errors in $T_j$ and the outer coupling ($\theta_j \neq 0$) only suppress the probability $p_{j,j+1}^2$ of obtaining the correct measurement outcomes (i.e. alternating the distribution of outcomes of $i\gamma_0\gamma_z = \pm 1$). If $\vartheta_{j,j+1}$ is small, as expected, and $T_{j,j+1}$ could be tuned close to their required values, than this probability will be close to 1. Since one knows the measurement outcomes, a success probability <1 does not affect the fidelity of the implemented gate, it only increases the waiting time until one achieves a run with all the desired measurement outcomes.

Note that since the measurement-only and the hybrid scheme implement similar (e.g., essentially the same) projectors (15) and (22), the hybrid scheme is also robust with respect to unintended measurements that (partially) project the system to an eigenstate of the Hamiltonian $H_j$. The effect of the latter will only manifest in a change of the success probability which eventually reaches Eq. (15) in the limit of strong measurements. Herein, such partial measurements in the eigenbasis of the Hamiltonian will be referred to as parallel dissipation as they arise from a system-environment coupling $\propto H_j$. Note that measurements (or dissipation) that act along a vector perpendicular to $H_j$ will lead to remaining decoherence. One advantage of the hybrid scheme is rather that it is robust against the leading sources of dissipation.

D. Numerics

In this section, the performance of the hybrid measurement scheme is considered. Models of both, the free evolution described by the Hamiltonian $H = \omega h_{\phi_h, \vartheta_h} \cdot \sigma/2$ similar to that of Eq. (16), and the effect of the measurements, are also considered. The measurements corresponding to the north and south pole can be implemented in a topologically protected way. They are therefore described by the projectors $P_{z_\tau}$ and $P_{\bar{z}}$ respectively. The reduction of the trace norm of the density matrix of the system then quantifies the success probability of finding the measurement outcomes corresponding to the projectors.

For the evolution of the qubit between the poles, the environment could measure the state of the ancillary qubit which leads to decoherence. Similarly, the unprotected measurements along the equator that are part of a measurement-only implementation can also be modeled by decoherence since knowledge of their measurement outcomes is not required. This allows one to describe the hybrid protocol with dissipation and the measurement-only protocol on the same footing in terms of dephasing due to environmental noise along the measurement axis $l(\phi_l, \vartheta_l) \cdot \sigma$, where $l(\phi_l, \vartheta) = \{\cos(\vartheta_l)\cos(\phi_l), \cos\vartheta_l \sin\phi_l, -\sin(\vartheta_l)\}$. The time evolution of the density matrix can then be cast in form of a Lindblad master equation, $$\dot\rho = -i[H, \rho] + L\rho L^\dagger - \frac{1}{2}\{L^\dagger L, \rho\}, \quad (24)$$

with $$L = \sqrt{\Gamma/2}\, l \cdot \sigma,$$

where $\Gamma$ is the corresponding dephasing rate. The above master equation results from a system environment coupling $H_{SE}=1\cdot\sigma\Phi/2$ after integrating out the environmental degrees of freedom which are assumed to be short-time correlated $\langle \Phi(t)\Phi(0) \rangle_E = 2\Gamma\delta(t)$. Note that the assumption of a short-time correlated environment describes the worst case scenario for embodiments of the disclosed geometric decoupling scheme. Environmental noise on time scales longer than the applied back and forth sweeps would, in fact, be efficiently canceled by the Chebyshev protocol.

Figure 5:
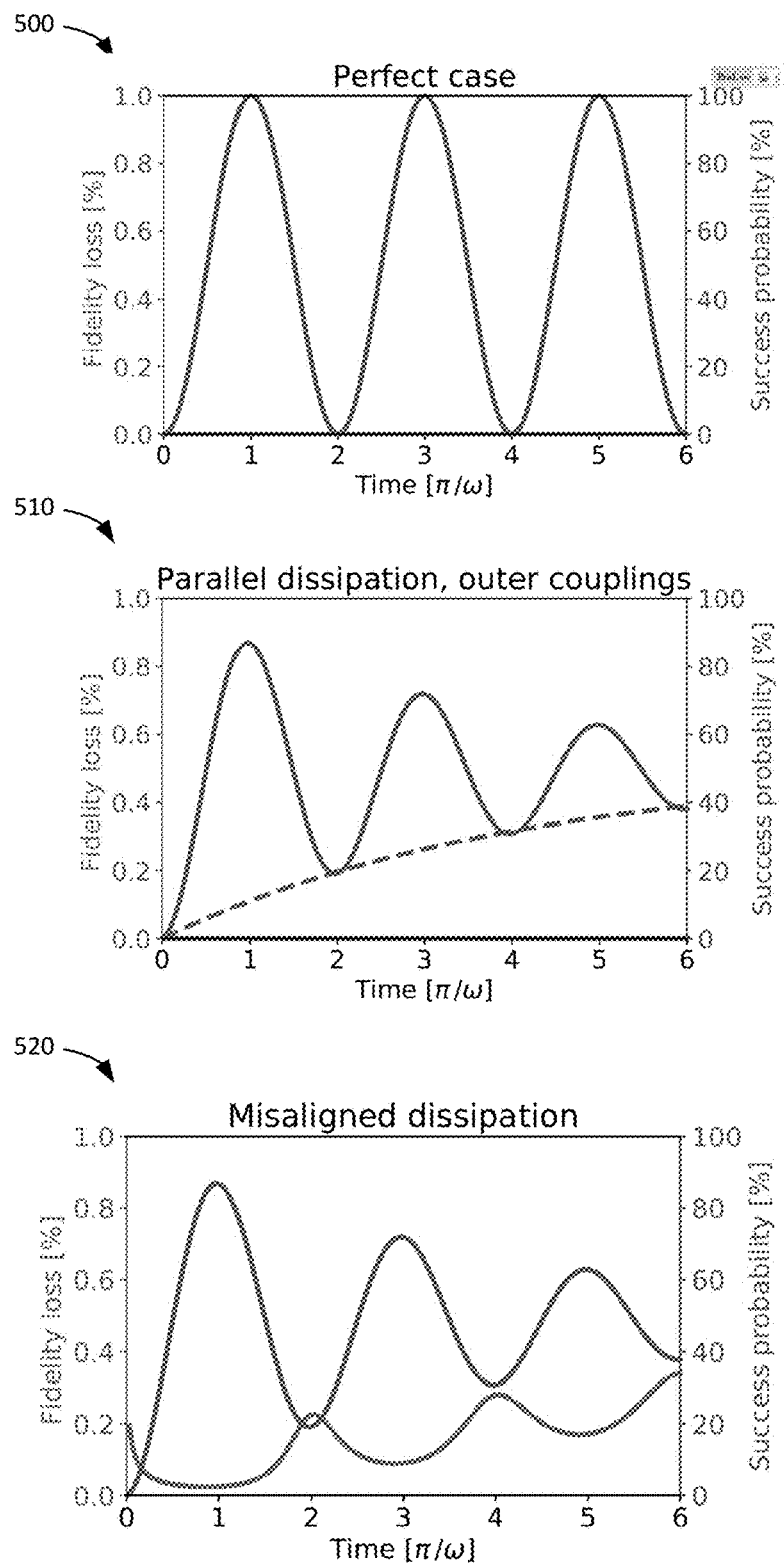
FIG. 5 shows several graphs illustrating simulation results illustrating aspects of the disclosed technology.

FIG. 5 shows several graphs 500, 510, 520 showing simulation results illustrating aspects of the disclosed technology. Graphs 500, 510, 520 show results of simulation of a single wedge north/south sweep implementation of a $\pi/8$ gate (turning points $\phi_1=0$, $\phi_2=\pi/8$). In general, the timing influences both the fidelity of the gate and the success probability. The fidelity is defined as the overlap of the final state to the desired magic state given a certain set of projectors (here north, south, north) were applied. The success probability quantifies the chance of obtaining the right measurement outcomes to implement the above set of projectors. Graph 500 shows the case of no dissipation (perfect case); graph 510 shows the case of dissipation l=h, $\Gamma$=0.5$\omega$/2$\pi$, outer couplings $\vartheta$=0.1$\pi$/2; and graph 520 shows the case of misaligned dissipation $\phi_l$=1.2$\phi_2$, $\vartheta_l$=1.2$\vartheta$ (where the fidelity loss is shown by the lower line). For comparison, the dashed line in graph 510 indicates the success probability in the case of a measurement-only procedure (1−exp(−$\Gamma$t))/2 purely due to dephasing (for simplicity $\vartheta$=0).

1. Single-Wedge Example

The interplay of the coherent and incoherent evolution can already be demonstrated using a hybrid evolution corresponding to tracing a single wedge of the Bloch sphere, cf. FIG. 4. Specifically, consider a protocol starting with an eigenstate of $P_{z_\tau}$ (north pole), projecting onto $P_z$ (equator, $\phi$=0), followed by a projection onto $P_{\bar z_\tau}$ (south pole). All the measurements can be performed in a topologically protected way and desired measurement outcomes can be obtained using forced measurements. One can, therefore, post-select by renormalizing the density matrix after applying the projectors. The resulting state serves as the initial state that is evolved by Eq. (24). The measurement process is then modeled by introducing a combination of coherent $(H=\omega 2h_{\phi_h,\vartheta_h}\cdot\sigma)$ and incoherent $$(L = \sqrt{\Gamma/2}\, l_{\phi_l,\vartheta_l} \cdot \sigma)$$

coupling of the Majorana modes for a time T. Finally, at the end of the time evolution the system is projected back to $P_{z_\tau}$ (north pole).

Let one first consider the fully coherent implementation of a $\pi/8$ gate ($\phi_h=\pi/8$, $\vartheta_h=0$ and $\Gamma$=0 (see FIGS. 5(a), 5(b), 5(c)). As described by Eq. (22). This implements a $\pi/8$ gate with certainty for $\omega T=(2n+1)\pi$. Away from this perfect timing the success probability of projecting the system to the north pole decreases. However, if the projection to the north pole is successful the resulting state is a perfect magic state with no loss of fidelity.

Next, consider adding a finite outer coupling $\vartheta_h\neq 0$ and parallel dissipation l=h, $\Gamma\neq 0$ (see 510). The outer coupling limits the success probability to values <1. Additionally, the oscillations will decay toward a 50% success probability with rate $\Gamma$ thus reaching the measurement-only limit for long times.

Finally, when the coherent and incoherent parts of the evolution are not aligned h≠l the post-selected final state of the system becomes mixed. This irreversible decoherence leads to a loss of fidelity growing over time. As expected, the highest fidelity can be achieved close to $\omega T=\pi$.

E. Conclusions

The problem of realizing a protected magic gate in a Majorana system remains a key challenge of the field. This gate was believed to require either very precise control of the Majorana couplings or a costly distillation process. See, J. D. Sau, S. Tewari, and S. Das Sarma, "Universal quantum computation in a semiconductor quantum wire network," Phys. Rev. A 82, 052322 (2010), arXiv:1007.4204. In this disclosure, it has been shown that a sequence of measurements and free evolution applied to four MZMs eliminates the need for fine tuning, as well as the ill effects of all low-frequency noise. The only remaining sources of error, therefore, are high-frequency fluctuations, which make changes in the device at time scales shorter than the time it takes to complete a cycle.

The hybrid approach affords a dramatic simplification of the scheme proposed in T. Karzig, Y. Oreg, G. Refael, and M. H. Freedman, "Universal Geometric Path to a Robust Majorana Magic Gate," Phys. Rev. X 6, 031019 (2016), arXiv:1511.05161. Indeed, the latter included an echo in the Majorana manipulation intended to cancel the residual dynamical effects due to some unavoidable couplings between the MZMs. The echo increased the vulnerability of the gate to noise acting on time scales faster than the duration of the entire decoupling scheme. The hybrid approaches manages to categorically eliminate the effects of the unwanted couplings, and, therefore, remove the need for carrying out the echo stage.

V. General Example Embodiments of the Disclosed Technology

Figure 10:
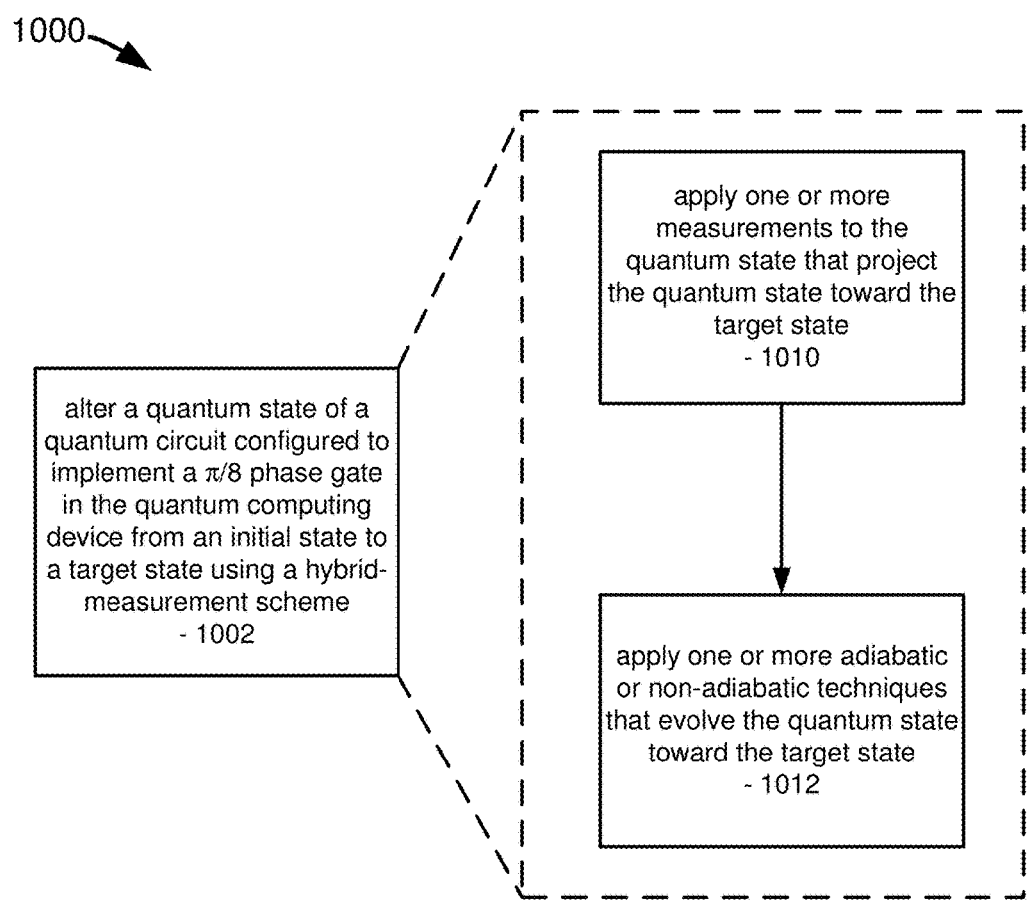
FIG. 10 is a flowchart showing a generalized example embodiment for implementing an embodiment of the disclosed technology.

FIG. 10 is a flowchart 1000 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 1000 illustrates a method for implementing a $\pi/8$ phase gate in a quantum computing device.

At 1002, a quantum state of a quantum circuit configured to implement the $\pi/8$ phase gate in the quantum computing device is altered from an initial state to a target state using a hybrid-measurement scheme. In the illustrated embodiment, the hybrid-measurement scheme comprises: at 1010, applying one or more measurements to the quantum state that project the quantum state toward the target state; and, at 1012, applying one or more adiabatic or non-adiabatic techniques that evolve the quantum state toward the target state.

In certain implementations, the quantum computing device is a topologically-protected-quantum-computing device. In some implementations, the hybrid-measurement scheme reduces timing noise, slow parameter noise, dynamical phase noise, and/or parallel dissipation. In certain implementations, the one or more measurements of the quantum state are applied between application of either (a) two of the non-adiabatic techniques; or (b) two of the adiabatic techniques. In some implementations, the applying of the one or more measurements of the quantum state comprises universal geometric decoupling of the quantum circuit. For example, the universal geometric decoupling can be performed by applying successive projection operators to the quantum circuit. In some examples, the successive projection operators are applied at turning points of a geometric decoupling trajectory, and the turning points are determined using Chebyshev polynomials. In further examples, the universal geometric decoupling of the quantum circuit maps to multiple parameter sweeps across poles of a unit sphere.

Any of the embodiments disclosed above can be implemented as part of a system comprising a quantum computing device comprising a quantum circuit; and a classical computing device in communication with the quantum computing device and adapted to perform any of the disclosed methods.

Any of the embodiments disclosed above can also be implemented by one or more computer-readable media storing computer-exectuable instructions, which when executed by a classical computer cause the classical computer to perform a method of controlling a quantum computing device according to any of the disclosed methods.

VI. Example Computing Environment

Figure 6:
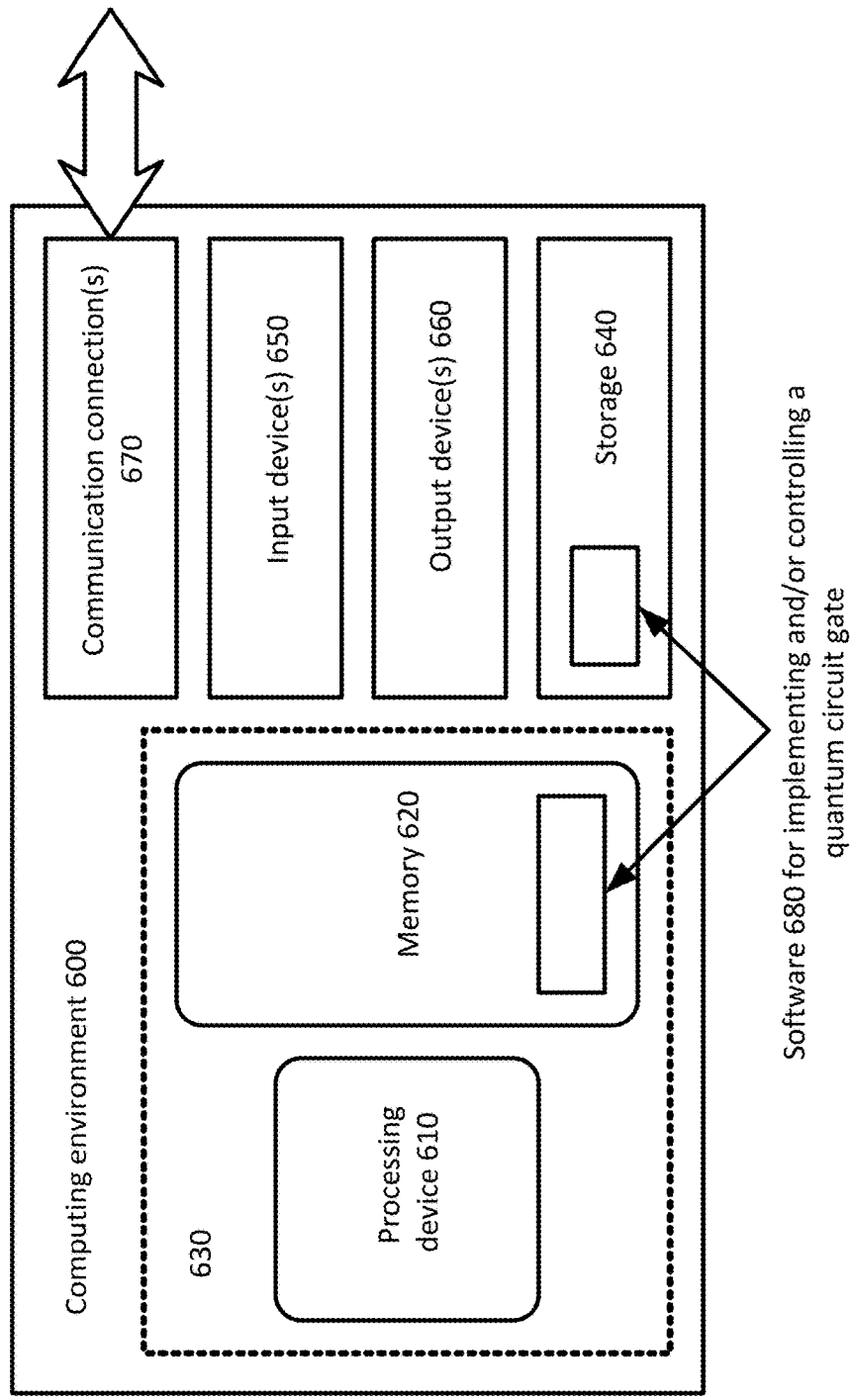
FIG. 6 illustrates a generalized example of a suitable classical computing environment in which several of the described embodiments can be implemented.

FIG. 6 illustrates a generalized example of a suitable classical computing environment 600 in which several of the described embodiments can be implemented. The computing environment 600 is not intended to suggest any limitation as to the scope of use or functionality of the disclosed technology, as the techniques and tools described herein can be implemented in diverse general-purpose or special-purpose environments that have computing hardware.

With reference to FIG. 6, the computing environment 600 includes at least one processing device 610 and memory 620. In FIG. 6, this most basic configuration 630 is included within a dashed line. The processing device 610 (e.g., a CPU or microprocessor) executes computer-executable instructions. In a multi-processing system, multiple processing devices execute computer-executable instructions to increase processing power. The memory 620 may be volatile memory (e.g., registers, cache, RAM, DRAM, SRAM), non-volatile memory (e.g., ROM, EEPROM, flash memory), or some combination of the two. The memory 620 stores software 680 implementing tools for performing any of the quantum circuit control techniques disclosed herein. The memory 620 can also store software 680 for synthesizing, generating (or compiling), and/or controlling quantum circuits as described herein.

The computing environment can have additional features. For example, the computing environment 600 includes storage 640, one or more input devices 650, one or more output devices 660, and one or more communication connections 670. An interconnection mechanism (not shown), such as a bus, controller, or network, interconnects the components of the computing environment 600. Typically, operating system software (not shown) provides an operating environment for other software executing in the computing environment 600, and coordinates activities of the components of the computing environment 600.

The storage 640 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 600. The storage 640 can also store instructions for the software 680 implementing any of the disclosed quantum circuit control mechanisms. The storage 640 can also store instructions for the software 680 for synthesizing, generating (or compiling), and/or controlling quantum circuits as described herein.

The input device(s) 650 can be a touch input device such as a keyboard, touchscreen, mouse, pen, trackball, a voice input device, a scanning device, or another device that provides input to the computing environment 600. The output device(s) 660 can be a display device (e.g., a computer monitor, laptop display, smartphone display, tablet display, netbook display, or touchscreen), printer, speaker, or another device that provides output from the computing environment 600.

The communication connection(s) 670 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, quantum circuit control techqniues, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 620 and/or storage 640, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 7:
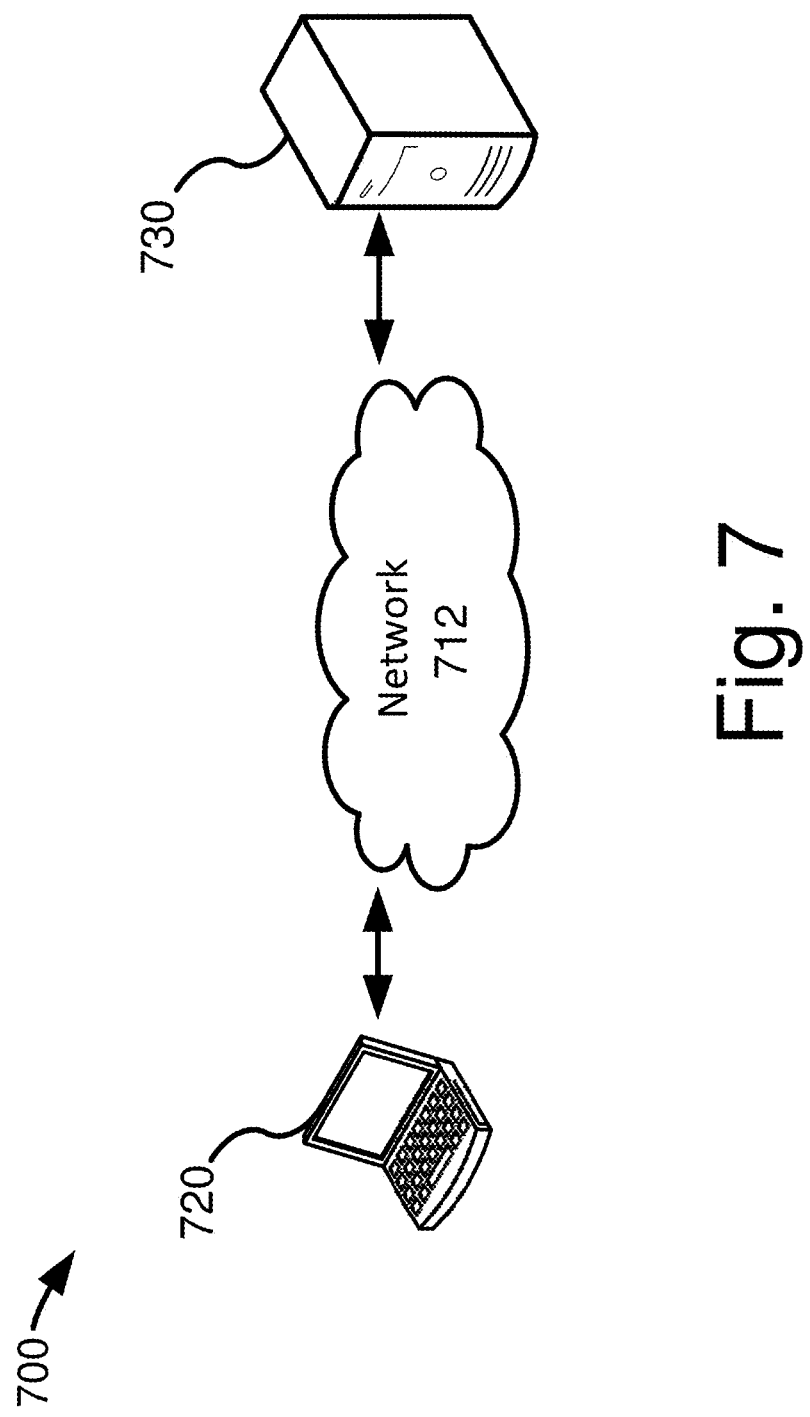
FIG. 7 illustrates an example of a possible network topology (e.g., a client server network) for implementing a system according to the disclosed technology.

An example of a possible network topology 700 (e.g., a client-server network) for implementing a system according to the disclosed technology is depicted in FIG. 7. Networked computing device 720 can be, for example, a computer running a browser or other software connected to a network 712. The computing device 720 can have a computer architecture as shown in FIG. 6 and discussed above. The computing device 720 is not limited to a traditional personal computer but can comprise other computing hardware configured to connect to and communicate with a network 712 (e.g., smart phones, laptop computers, tablet computers, or other mobile computing devices, servers, network devices, dedicated devices, and the like). Further, the computing device 720 can comprise an FPGA or other programmable logic device. In the illustrated embodiment, the computing device 720 is configured to communicate with a computing device 730 (e.g., a remote server, such as a server in a cloud computing environment) via a network 712. In the illustrated embodiment, the computing device 720 is configured to transmit input data to the computing device 730, and the computing device 730 is configured to implement a quantum circuit control technique according to any of the disclosed embodiments and/or a circuit generation or compilation/synthesis methods for generating qunatum circuits for use with any of the techniques disclosed herein. The computing device 730 can output results to the computing device 720. Any of the data received from the computing device 730 can be stored or displayed on the computing device 720 (e.g., displayed as data on a graphical user interface or web page at the computing devices 720). In the illustrated embodiment, the illustrated network 712 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 712 can be the Internet or a similar public network and operate using an appropriate protocol (e.g., the HTTP protocol).

Figure 8:
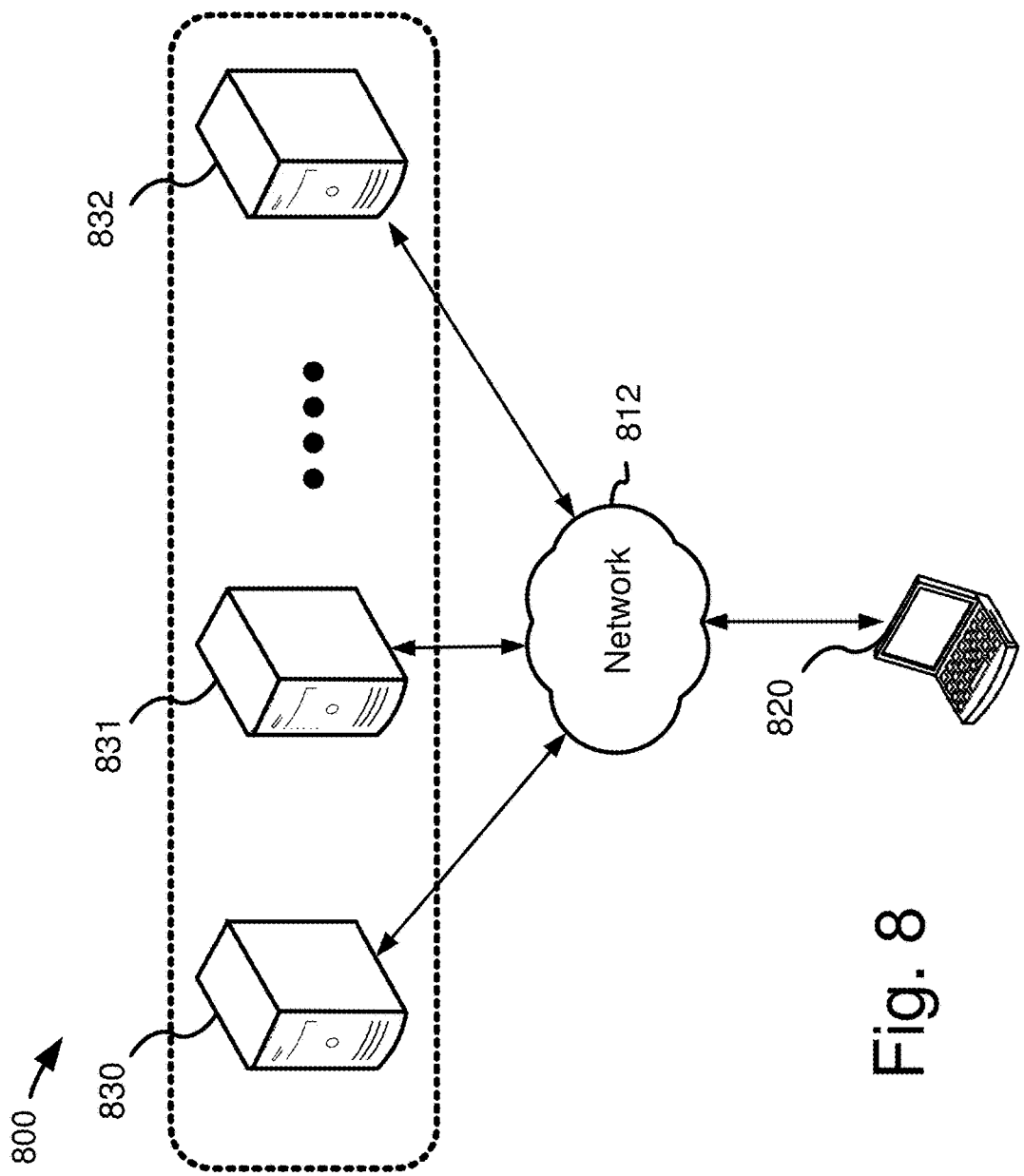
FIG. 8 illustrates another example of a possible network topology (e.g., a distributed computing environment) for implementing a system according to the disclosed technology.

Another example of a possible network topology 800 (e.g., a distributed computing environment) for implementing a system according to the disclosed technology is depicted in FIG. 8. Networked computing device 820 can be, for example, a computer running a browser or other software connected to a network 812. The computing device 820 can have a computer architecture as shown in FIG. 6 and discussed above. In the illustrated embodiment, the computing device 820 is configured to communicate with multiple computing devices 830, 831, 832 (e.g., remote servers or other distributed computing devices, such as one or more servers in a cloud computing environment) via the network 812. In the illustrated embodiment, each of the computing devices 830, 831, 832 in the computing environment 800 is used to perform at least a portion of a quantum circuit control technique according to any of the disclosed embodiments and/or a circuit generation or compilation/synthesis methods for generating qunatum circuits for use with any of the techniques disclosed herein. In other words, the computing devices 830, 831, 832 form a distributed computing environment in which the quantum circuit control and/or generation/compilation/synthesis processes are shared across multiple computing devices. The computing device 820 is configured to transmit input data to the computing devices 830, 831, 832, which are configured to distributively implement such as process, including performance of any of the disclosed methods or creation of any of the disclosed circuits, and to provide results to the computing device 820. Any of the data received from the computing devices 830, 831, 832 can be stored or displayed on the computing device 820 (e.g., displayed as data on a graphical user interface or web page at the computing devices 820). The illustrated network 812 can be any of the networks discussed above with respect to FIG. 7.

Figure 9:
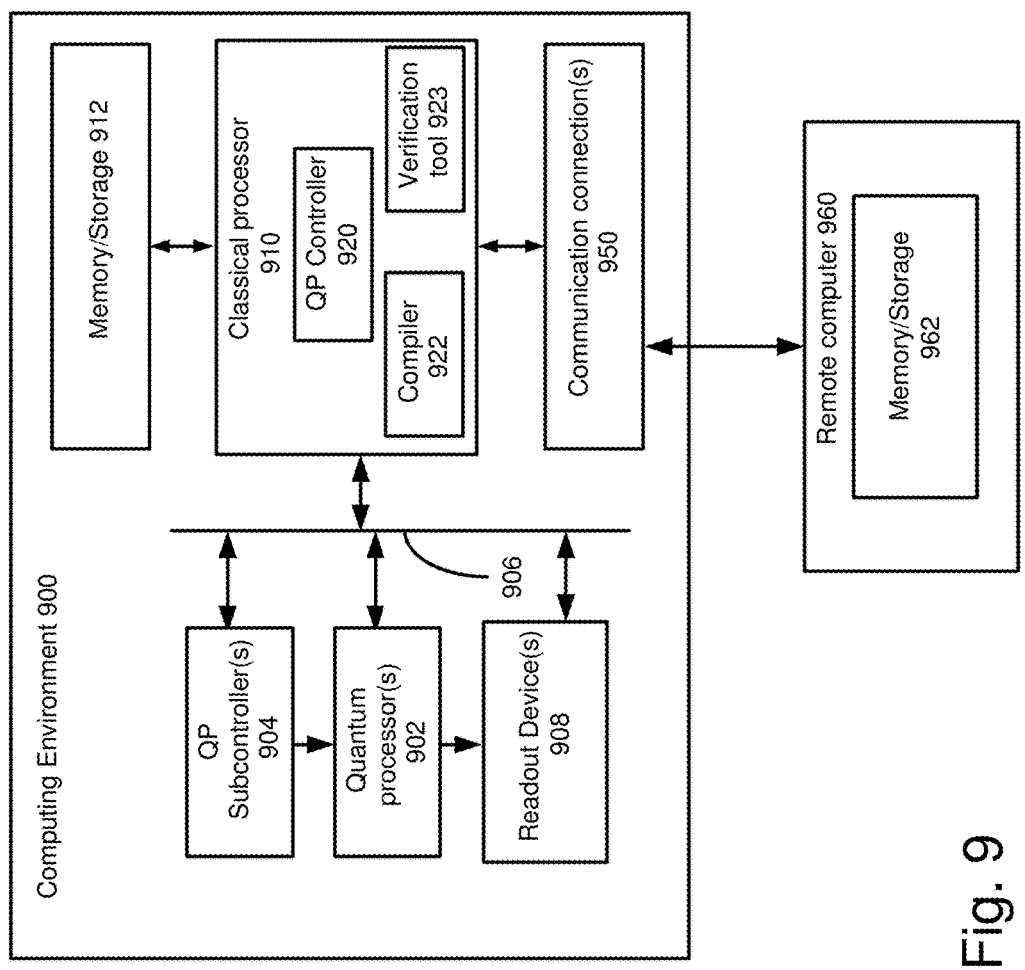
FIG. 9 illustrates an exemplary system for implementing the disclosed technology.

With reference to FIG. 9, an exemplary system for implementing the disclosed technology includes computing environment 900. In computing environment 1100, a compiled quantum computer circuit description (including quantum circuits resulting from and/or supported by any of the quantum circuit control techniques as disclosed herein) can be used to program (or configure) one or more quantum processing units such that the quantum processing unit(s) implement the circuit described by the quantum computer circuit description.

The environment 900 includes one or more quantum processing units 902 and one or more readout device(s) 908. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 906 at the control of quantum processor controller 920. The quantum processor controller (QP controller) 920 can operate in conjunction with a classical processor 910 (e.g., having an architecture as described above with respect to FIG. 6) to implement the desired quantum computing process. In the illustrated example, the QP controller 920 further implements the desired quantum computing process via one or more QP subcontrollers 904 that are specially adapted to control a corresponding one of the quantum processor(s) 902. For instance, in one example, the quantum controller 920 facilitates implementation of the compiled quantum circuit by sending instructions to one or more memories (e.g., lower-temperature memories), which then pass the instructions to low-temperature control unit(s) (e.g., QP subcontroller(s) 904) that transmit, for instance, pulse sequences representing the gates to the quantum processing unit(s) 902 for implementation. In other examples, the QP controller(s) 920 and QP subcontroller(s) 904 operate to provide appropriate magnetic fields, encoded operations, or other such control signals to the quantum processor(s) to implement the operations of the compiled quantum computer circuit description. The quantum controller(s) can further interact with readout devices 908 to help control and implement the desired quantum computing process (e.g., by reading or measuring out data results from the quantum processing units once available, etc.)

With reference to FIG. 9, compilation is the process of translating a high-level description of a quantum algorithm into a quantum computer circuit description comprising a sequence of quantum operations or gates, which can include the circuits as disclosed herein. The compilation can be performed by a compiler 922 using a classical processor 910 (e.g., as shown in FIG. 6) of the environment 900 which loads the high-level description from memory or storage devices 912 and stores the resulting quantum computer circuit description in the memory or storage devices 912.

In other embodiments, compilation and/or verification can be performed remotely by a remote computer 960 (e.g., a computer having a computing environment as described above with respect to FIG. 6) which stores the resulting quantum computer circuit description in one or more memory or storage devices 962 and transmits the quantum computer circuit description to the computing environment 900 for implementation in the quantum processing unit(s)

902. Still further, the remote computer 900 can store the high-level description in the memory or storage devices 962 and transmit the high-level description to the computing environment 900 for compilation and use with the quantum processor(s). In any of these scenarios, results from the computation performed by the quantum processor(s) can be communicated to the remote computer after and/or during the computation process. Still further, the remote computer can communicate with the QP controller(s) 920 such that the quantum computing process (including any compilation, verification, and QP control procedures) can be remotely controlled by the remote computer 960. In general, the remote computer 960 communicates with the QP controller(s) 920, compiler/synthesizer 922, and/or verification tool 923 via communication connections 950.

In particular embodiments, the environment 900 can be a cloud computing environment, which provides the quantum processing resources of the environment 900 to one or more remote computers (such as remote computer 960) over a suitable network (which can include the internet).

VII. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method for implementing a π/8 phase gate in a quantum computing device, comprising:
   altering a quantum state of a quantum circuit configured to implement the π/8 phase gate in the quantum computing device from an initial state to a target state using a hybrid-measurement scheme, the hybrid-measurement scheme comprising:
   applying one or more measurements to the quantum state that project the quantum state toward the target state; and
   applying one or more adiabatic or non-adiabatic techniques that evolve the quantum state toward the target state.

2. The method of claim 1, wherein the quantum computing device is a topologically-protected-quantum-computing device.

3. The method of claim 1, wherein the hybrid-measurement scheme reduces timing noise, slow parameter noise, dynamical phase noise, and/or parallel dissipation.

4. The method of claim 1, wherein the one or more measurements of the quantum state are applied between application of either (a) two of the non-adiabatic techniques; or (b) two of the adiabatic techniques.

5. The method of claim 1, wherein the applying of the one or more measurements of the quantum state comprises universal geometric decoupling of the quantum circuit.

6. The method of claim 5, wherein universal decoupling comprises applying successive projection operators to the quantum circuit.

7. The method of claim 6, wherein the successive projection operators are applied at turning points of a geometric decoupling trajectory, and wherein the turning points are determined using Chebyshev polynomials.

8. The method of claim 5, wherein the universal geometric decoupling of the quantum circuit maps to multiple parameter sweeps across poles of a unit sphere.

9. A system, comprising:
   a quantum computing device comprising a quantum circuit; and
   a classical computing device in communication with the quantum computing device and adapted to perform a method, comprising:
   altering a quantum state of a quantum circuit configured to implement a π/8 phase gate in the quantum computing device from an initial state to a target state using a hybrid-measurement scheme, the hybrid-measurement scheme comprising:
   applying one or more measurements to the quantum state that project the quantum state toward the target state; and
   applying one or more adiabatic or non-adiabatic techniques that evolve the quantum state toward the target state.

10. The system of claim 9, wherein the quantum computing device is a topologically-protected-quantum-computing device.

11. The system of claim 9, wherein the hybrid-measurement scheme reduces timing noise, slow parameter noise, dynamical phase noise, and/or parallel dissipation.

12. The system of claim 9, wherein the one or more measurements of the quantum state are applied between application of either (a) two of the non adiabatic techniques; or (b) two of the adiabatic techniques.

13. The system of claim 9, wherein the applying of the one or more measurements of the quantum state comprises universal geometric decoupling of the quantum circuit.

14. The system of claim 13, wherein the universal decoupling comprises applying successive projection operators to the quantum circuit.

15. The system of claim 14, wherein the successive projection operators are applied at turning points of a geometric decoupling trajectory, and wherein the turning points are determined using Chebyshev polynomials.

16. The system of claim 13, wherein the universal geometric decoupling of the quantum circuit maps to multiple parameter sweeps across poles of a unit sphere.

17. One or more computer-readable media storing computer-exectuable instructions, which when executed by a classical computer cause the classical computer to perform a method of controlling a quantum computing device, the method comprising:
   altering a quantum state of a quantum circuit configured to implement a π/8 phase gate in the quantum computing device from an initial state to a target state using a hybrid-measurement scheme, the hybrid-measurement scheme comprising:
   applying one or more measurements to the quantum state that project the quantum state toward the target state; and
   applying one or more adiabatic or non-adiabatic techniques that evolve the quantum state toward the target state.

18. The one or more computer-readable media of claim 17, wherein the quantum computing device is a topological quantum computing device.

19. The one or more computer-readable media of claim 17, wherein the measurement scheme comprises universal geometric decoupling of the quantum circuit.

20. The one or more computer-readable media of claim 19, wherein the universal decoupling comprises applying successive projection operators to the quantum circuit.

\* \* \* \* \*